(12) United States Patent
Courtet et al.

(10) Patent No.: US 12,371,580 B2
(45) Date of Patent: Jul. 29, 2025

(54) RADIATION CURABLE INKJET INKS

(71) Applicant: Agfa NV, Mortsel (BE)

(72) Inventors: Vincent Courtet, Mortsel (BE); Jens Lenaerts, Mortsel (BE); Yiru Li, Mortsel (BE); Matthieu Retailleau, Mortsel (BE)

(73) Assignee: Agfa NV, Mortsel (BE)

( * ) Notice: Subject to any disclaimer, the term of this patent is extended or adjusted under 35 U.S.C. 154(b) by 1193 days.

(21) Appl. No.: 17/265,392

(22) PCT Filed: Aug. 7, 2019

(86) PCT No.: PCT/EP2019/071162
§ 371 (c)(1),
(2) Date: Feb. 2, 2021

(87) PCT Pub. No.: WO2020/030664
PCT Pub. Date: Feb. 13, 2020

(65) Prior Publication Data
US 2021/0332255 A1     Oct. 28, 2021

(30) Foreign Application Priority Data
Aug. 10, 2018 (EP) .................................. 18188386

(51) Int. Cl.
| | |
|---|---|
| *C09D 11/101* | (2014.01) |
| *B41M 5/00* | (2006.01) |
| *B41M 7/00* | (2006.01) |
| *C08F 2/48* | (2006.01) |
| *C08F 220/30* | (2006.01) |
| *C08F 226/06* | (2006.01) |
| *C08K 3/26* | (2006.01) |
| *C08K 5/5397* | (2006.01) |
| *C09D 11/037* | (2014.01) |
| *C09D 11/107* | (2014.01) |
| *C09D 11/322* | (2014.01) |
| *C09D 11/324* | (2014.01) |
| *C09D 11/38* | (2014.01) |
| *C09D 11/40* | (2014.01) |
| *C14C 11/00* | (2006.01) |
| *C08K 3/22* | (2006.01) |

(52) U.S. Cl.
CPC ......... *C09D 11/101* (2013.01); *B41M 5/0023* (2013.01); *B41M 5/0047* (2013.01); *B41M 5/0076* (2013.01); *B41M 7/0081* (2013.01); *C08F 2/48* (2013.01); *C08F 220/301* (2020.02); *C08F 226/06* (2013.01); *C08K 3/26* (2013.01); *C08K 5/5397* (2013.01); *C09D 11/037* (2013.01); *C09D 11/107* (2013.01); *C09D 11/322* (2013.01); *C09D 11/324* (2013.01); *C09D 11/38* (2013.01); *C09D 11/40* (2013.01); *C14C 11/003* (2013.01); *C08K 2003/2241* (2013.01)

(58) Field of Classification Search
CPC ...... C09D 11/101; C09D 11/322; C09D 11/40
See application file for complete search history.

(56) References Cited

U.S. PATENT DOCUMENTS

| | | |
|---|---|---|
| 2004/0024078 A1 | 2/2004 | Itoh et al. |
| 2007/0211111 A1 | 9/2007 | Hayata |
| 2008/0108747 A1 | 5/2008 | Nakamura et al. |
| 2009/0095201 A1* | 4/2009 | Heitzmann ......... C09B 67/0096 106/31.6 |
| 2014/0062076 A1 | 3/2014 | Makuta et al. |
| 2015/0284579 A1 | 10/2015 | Mizutani et al. |
| 2017/0022379 A1 | 1/2017 | Loccufier et al. |

FOREIGN PATENT DOCUMENTS

| | | | | |
|---|---|---|---|---|
| CN | 102604476 A | | 7/2012 | |
| CN | 103660657 A | | 3/2014 | |
| CN | 104066803 A | * | 9/2014 | .......... B41M 7/0081 |
| CN | 104479460 A | | 4/2015 | |
| CN | 106457862 A | | 2/2017 | |
| CN | 108367581 A | | 8/2018 | |
| EP | 1967556 A1 | | 9/2008 | |
| EP | 2053099 A1 | | 4/2009 | |
| EP | 2818327 A1 | * | 12/2014 | ............ B41J 2/2107 |
| EP | 2913370 A1 | | 9/2015 | |
| EP | 3222684 A1 | | 9/2017 | |
| EP | 3305508 A1 | | 4/2018 | |
| EP | 3608373 B1 | * | 10/2021 | .......... B41M 5/0023 |
| EP | 3833719 B1 | * | 1/2023 | .......... B41M 5/0023 |
| WO | WO 2015/184166 A1 | | 12/2015 | |

OTHER PUBLICATIONS

Written Opinion relating to PCT/EP2019/071162 dated Oct. 21, 2019, 5 pages.
International Search Report relating to PCT/EP2019/071162 dated Oct. 21, 2019, 4 pages.

* cited by examiner

*Primary Examiner* — Sophie Hon
(74) *Attorney, Agent, or Firm* — Leydig, Voit & Mayer, Ltd.

(57) ABSTRACT

A radiation curable white inkjet ink including at least 18.5 wt % of white pigment and 0 to 35 wt % of organic solvent, both weight percentages based on the total weight of the radiation curable white inkjet ink and a polymerizable composition containing 0 to 15.0 wt % of one or more polyfunctional polymerizable compounds, and at least 85.0 wt % of one or more monofunctional polymerizable compounds; and a specific polymerizable composition.

14 Claims, No Drawings

RADIATION CURABLE INKJET INKS

REFERENCE TO RELATED APPLICATIONS

This application is a 371 National Stage Application of PCT/EP2019/071162, filed Aug. 7, 2019, which claims the benefit of European Application No. 18188386.9, filed Aug. 10, 2018, the contents of which are incorporated by reference herein in their entirety.

TECHNICAL FIELD

The present invention relates to radiation curable inkjet inks for producing cured images exhibiting good flexing properties.

BACKGROUND

Flexographic and screen printing systems are being increasingly replaced by industrial inkjet printing systems due to their enhanced reliability, allowing their incorporation into production lines, and due to their flexibility in use, e.g. variable data printing allowing small run lengths or even a single print. Radiation curable inkjet inks are particularly preferred because high quality images can be printed on non-absorbing ink-receivers.

Often these ink-receivers are rigid substrates, but in some cases the substrates are flexible requiring also the inkjet ink to have a certain degree of flexibility. For example, a UV cured inkjet image may be printed on a PVC-foil for attaching it to a convex surface, such as a pillar of a building. The inkjet image should then be sufficiently flexible not to crack when attached to the pillar.

Decreasing the ratio of polyfunctional monomers over monofunctional monomers in UV curable inkjet inks leads to less cross-linked polymers, which is known to be advantageous for a higher flexibility. For example, for providing excellent adhesion and flexibility, EP 1967556 A (TOYO INK) discloses an active energy beam-curable inkjet ink containing from 90 to 99.99% by weight of a monofunctional monomer, and from 0.01 to 10% by weight of a polyfunctional monomer.

Flexing differs from flexibility in that the bending of a substrate to which the ink image adheres occurs frequently. For example, an ink image printed on natural leather used for shoes is bent with each step taken during walking. Another example is an ink image printed on a tarpaulin (truck curtain), where the ink image is frequently bent upon loading and unloading the truck. Flexing is especially critical for a white inkjet ink. If a coloured leather or a coloured tarpaulin is used, then a white ink is applied as background for colour inks in order to obtain a vibrant colour image. For masking the colour of the background, the lay down of white ink is usually much higher than that of colour ink, especially when the background is a dark colour such as black.

Another example is given by US 2004024078 A (SEIREN) disclosing a UV curable ink including a coloring component, a reactive oligomer and/or a reactive prepolymer, a reactive diluent and a photoinitiator, wherein a polymer of the reactive oligomer and/or reactive prepolymer and a polymer of the reactive diluent have a glass transition point of 0° C. to 70° C. The cured film of such an ink exhibited good flexibility, scratch resistance and adhesion. However, according to [0021] the ink compositions have a rather high viscosity of 60 to 800 cps at 25° C., thus requiring very high jetting temperatures of 60° or more.

US 2008108747 A (FUJIFILM) discloses ink compositions including a polymerization initiator, a (meth)acrylate having a double bond with a carbon atom having an $sp^3$ hybrid orbital at an alpha position, and a colorant. Using the specific polymerizable compound in an ink composition leads to an enhanced image flexibility after curing, while maintaining high sensitivity and adhesion of the image to a recording medium.

US 2007211111 A (FUJIFILM) discloses an ink composition including an N-vinyl lactam, a radically polymerizable compound, and a polymerization initiator, the content of the N-vinyl lactam being at least 10 wt % of the ink total weight, and the content ratio by weight of N-vinyl lactam to the radically polymerizable compound being 1:8.5 to 1. The ink leads to cured images having excellent flexibility and adhesion to a substrate.

Despite all the suggested ink compositions, there still remains a need for radiation curable inkjet inks, especially radiation curable white inkjet inks, exhibiting good flexing properties without sacrificing image quality and inkjet printing reliability, as the latter is important in an industrial manufacturing environment.

SUMMARY OF INVENTION

In order to overcome the problems described above, preferred embodiments of the present invention provide inkjet inks including specific monofunctional and polyfunctional monomers in specific amounts.

It was found that a radiation curable white inkjet ink exhibiting excellent flexing and image quality could be obtained by using a specific combination of polymerizable compounds and by increasing the content of the white pigment to a level in the ink above that of 8 to 16 wt %, which is normally applied in UV curable inkjet inks. By increasing the white pigment content, a thinner white ink layer is obtained that also proved to be advantageous for flexibility.

Preferred embodiments of the invention have been realised with a free radical curable white inkjet ink as defined by claim 1.

Further advantages and preferred embodiments of the present invention will become apparent from the following description.

DESCRIPTION

Definitions

The term "radiation curable", as used in radiation curable inkjet ink means that the inkjet ink is curable by actinic radiation, such as UV radiation and e-beam, preferably UV radiation. The latter inkjet inks are also referred to as UV curable inkjet inks.

The term "monofunctional", as used in monofunctional polymerizable compounds means polymerizable compounds containing a single polymerizable group.

The term "polyfunctional", as used in polyfunctional polymerizable compounds means polymerizable compounds containing two, three or more polymerizable groups.

Radiation Curable White Inkjet Inks

In a preferred embodiment of the present invention, the radiation curable white inkjet ink includes at least 18.5 wt % of white pigment and 0 to 35 wt % of organic solvent, both weight percentages based on the total weight of the radiation curable white inkjet ink and a polymerizable composition containing 0 to 15.0 wt % of one or more polyfunctional polymerizable compounds, and at least 85.0 wt % of one or more monofunctional polymerizable compounds; wherein the polymerizable composition has an Ink Composition Value ICV≤30; with the Ink Composition Value ICV represented by Formula (I):

$$ICV = \frac{147 \times \text{wt \%}(NVC) + \sum_{i=1}^{18}(10 \times i - 75) \times \text{wt \%}(i)}{\sum_{i=1}^{18}\text{wt \%}(i)}, \quad \text{Formula (I)}$$

wherein i represents an integer of 1 to 18; wt % (NVC) is the wt % of N-vinyl caprolactam if present; wt % (i) is the wt % of the monomers belonging to group i; wherein polymerizable compounds other than those in groups i=1 to 18 are present in an amount of 0 to 20.0 wt %; wherein one or more oligomers are present in an amount of 0 to 15 wt %; wherein all the weight percentages of N-vinylcaprolactam, oligomers and polymerizable compounds are based on the total weight of the polymerizable composition;

wherein the polymerizable compounds of group i=1 include di-ethyleneglycolbutyletheracrylate; 2-ethyl hexyl acrylate; ethoxydiethyleneglycolacrylate; di(ethylene glycol) 2-ethylhexyl ether acrylate; methoxy polyethylene glycol (550) monomethacrylate; lauryl methacrylate; octyl-decylacrylate; n-octylacrylate; 4-hydroxybutylacrylateglycidylether; 2-hydroxyethylmethacrylate acidphosphate; and methoxypolyethyleneglycol(350)monomethacrylate;

wherein the polymerizable compounds of group i=2 include isodecyl acrylate; isononyl acrylate; caprolacton-modified-tetrahydrofurfurylacrylate; methoxypolyethyleneglycol (350)monoacrylate; tridecyl acrylate; 2(2-ethoxyethoxy) ethyl acrylate; isooctyl acrylate; butylacrylate; and polycaprolactone acrylate;

wherein the polymerizable compounds of group i=3 include methoxy polyethylene glycol (550) monoacrylate; 2-methoxyethyl acrylate; ethoxylated (4) lauryl acrylate; iso-amylacrylate; methoxy-triethyleneglycolacrylate; ethoxylated(2) hydroxyethyl methacrylate; ethoxylated(30) bisphenol A diacrylate; polyethylene glycol (600) diacrylate; ethoxylated(8) nonylphenolacrylate; and isodecylmethacrylate; wherein the polymerizable compounds of group i=4 include ethoxylated(20) trimethylolpropane triacrylate; 4-hydroxy butyl acrylate; tridecyl methacrylate; polyethylene glycol (600) dimethacrylate; 1H, 1H,5H-octafluoropentylacrylate; ethoxylated(15) trimethylolpropane triacrylate; and 2-ethoxyethylmethacrylate;

wherein the polymerizable compounds of group i=5 include lauryl acrylate; caprolacton-modified(6M)neopentylglycol-hydroxypivalatediacrylate; ethoxylated(4) nonylphenol acrylate; polyethylene glycol (400) diacrylate; phenoxy-polyethyleneglycolacrylate; ethylacrylate; and polyethylene glycol (400) dimethacrylate;

wherein the polymerizable compounds of group i=6 include ethoxylated(9) trimethylolpropane triacrylate; isostearylacrylate; tetrahydrofurfuryl acrylate; propoxylated(3) trimethylolpropane triacrylate; hydroxyethyl acrylate; and propoxylated(5.5) glyceryl triacrylate;

wherein the polymerizable compounds of group i=7 include 2-ethylhexyl methacrylate; tetraethylene glycol dimethacrylate; ethoxylated(6) trimethylolpropane triacrylate; triethylene glycol dimethacrylate; (2-ethyl-2-methyl-1,3-dioxolan-4-yl)methyl acrylate; 2-hydroxypropyl acrylate; 2-propylheptylacrylate; hexanediol ethoxylated (3) diacrylate; 2,2,2-trifluoroethylacrylate; 2-(((butylamino)carbonyl)oxy)ethyl-ester 2-propenoic acid; and ethoxylated(10) bisphenol A dimethacrylate;

wherein the polymerizable compounds of group i=8 include ethoxylated(10) bisphenol A diacrylate; 3-ethyl-3-oxetanyl-methacrylate; 2-phenoxyethyl acrylate; ethoxylated(2) bisphenol A dimethacrylate; benzylacrylate; 2-ethylhexyldiglycolacrylate; stearylacrylate; 2-hydroxybutylacrylate; methylacrylate; cyclic trimethylolpropane formal acrylate; ethoxylated(4)phenolacrylate; dicyclopentenylacrylate; and dicyclopentenyl-oxyethyl acrylate;

wherein the polymerizable compounds of group i=9 include polyethylene glycol (200) diacrylate; caprolacton-modified (2M)neopentylglycol hydroxypivalatediacrylate; cyclohexylacrylate; 2-hydroxy-3-phenoxypropylacrylate; propoxylated(3) glyceryl triacrylate; dimethylaminoethyl-methacrylate; 1,4-cyclohexanedimethanolmonoacrylate; ethoxylated(3) trimethylolpropane triacrylate; diethylaminoethylmethacrylate; and n-butyl methacrylate; wherein the polymerizable compounds of group l=10 include propoxylated(6) trimethylolpropane triacrylate; cyclohexanespriro-2-(1,3-dioxolane-4-yl))methylacrylate; tetraethylene glycol diacrylate; 2-hydroxypropylmethacrylate; trimethylolpropane trimethacrylate; isophorylacrylate; and 1,6 hexanediol dimethacrylate;

wherein the polymerizable compounds of group l=11 include propoxylated neopentyl glycol diacrylate; (Octahydro-4,7-methano-1H-indenyl)methyl acrylate; 1H,1H, 5H-octafluoropentylmethacrylate; stearyl methacrylate; and tetrahydrofurfuryl methacrylate;

wherein the polymerizable compounds of group l=12 include glycidyl methacrylate; 3,3,5-trimethylcyclohexanolmethacrylate; 1,6 hexanediol diacrylate; 1,4-butanediol diacrylate; dicyclopentenyl-oxyethylmethacrylate; 4-tert.butyl-cyclohexylacrylate; ethoxylated (2) neopentylglycoldiacrylate; isobutylmethacrylate; and 3-methyl-1,5-pentanedioldiacrylate;

wherein the polymerizable compounds of group l=13 include allylmethacrylate; 2-phenoxyethyl methacrylate; ethoxylated(6) bisphenol A dimethacrylate; benzylmethacrylate; 1,4-butanediol dimethacrylate; tertiarybutylacrylate; 2-hydroxyethyl methacrylate; 2-(2-vinyloxyethoxy) ethyl acrylate; and ethoxylated(4) bisphenol A diacrylate;

wherein the polymerizable compounds of group l=14 include tris (2-hydroxy ethyl) isocyanurate triacrylate; tripropylene glycol diacrylate; trimethylolpropane triacrylate; ethylmethacrylate; diethylene glycol dimethacrylate; dicyclopentadienyl acrylate; ethoxylated(3) bisphenol A diacrylate; and ethoxylated (4) pentaerythritol tetraacrylate;

wherein the polymerizable compounds of group l=15 include di-acetonacrylamide; dioxaneglycoldiacrylate; and ethoxylated(4) nonyl phenol methacrylate;

wherein the polymerizable compounds of group l=16 include 2,2,2-trifluoroethylmetacrylate; cyclohexylmethacrylate; and dipentaerythritol pentaacrylate;

wherein the polymerizable compounds of group i=17 include 1,10-decanedioldiacrylate; isobornyl acrylate; di-trimethylpropane tetraacrylate; and diethylene glycol diacrylate;

wherein the polymerizable compounds of group i=18 include 1,3-butylene glycol diacrylate; pentaerythritol tetraacrylate; pentaerythritol triacrylate; dipropylene glycol diacrylate; methylmethacrylate; neopentyl glycol diacrylate; tertiarybutylmethacrylate; acryloyl morpholine; ethoxylated(4)bisphenol-A-dimethacrylate; isobornyl methacrylate; dicyclopentanyl acrylate; and dihydrocyclopentadienylacrylate.

In a preferred embodiment of the radiation curable white inkjet ink, the polymerizable composition has an Ink Composition Value ICV≤30, preferably an Ink Composition Value ICV between 0 and 27 and more preferably between 5 and 25. In the latter ranges, good flexing is combined with good scratch resistance.

In a preferred embodiment of the radiation curable white inkjet ink, the wt % (NVC) is no more than 19.0 wt %, preferably no more than 17.0 wt %, more preferably no more than 15.0 wt %, and most preferably 0 to 10.0 wt %.

In a preferred embodiment of the radiation curable white inkjet ink, the content of the one or more polyfunctional polymerizable compounds is between 0.5 wt % and 10.0 wt %, more preferably between 0.8 wt % and 8 wt %. The inclusion of one or more polyfunctional polymerizable compounds in the above ranges has an advantageous effect on the strength of the ink layer and on the curing speed.

In a preferred embodiment of the radiation curable white inkjet ink, the polymerizable composition contains 1.0 to 10.0 wt %, more preferably 2.0 to 7.5 wt % and most preferably 3.0 to 5.0 wt % of one or more polyfunctional polymerizable compounds preferably selected from the group consisting of polyethylene glycol diacrylate, ethoxylated bisphenol A diacrylate, caprolacton-modified neopentylglycolhydroxypivalate diacrylate and ethoxylated hexanediol diacrylate. The inclusion of one or more of these polyfunctional polymerizable compounds in the above ranges has a large advantageous effect on the strength of the ink layer and on the curing speed.

In a preferred embodiment of the radiation curable white inkjet ink, the polymerizable composition contains 0.0 to 5.0 wt %, more preferably 0.0 to 2.0 wt % and most preferably 0.0 wt % of polyfunctional polymerizable compounds having more than two polymerizable groups.

In a preferred embodiment, the radiation curable white inkjet ink includes 0 to 25 wt %, preferably 0 to 15 wt %, more preferably 0 to 10 wt % of organic solvent based on the total weight of the radiation curable white inkjet ink. In the most preferred embodiment, no organic solvent is intentionally added. Image quality is enhanced when less organic solvent is used. If no organic solvent is present, instant UV pinning is possible as no solvent has to be evaporated first.

In a preferred embodiment of the radiation curable white inkjet ink, less than 50 wt %, preferably less than 40 wt %, more preferably less than 25 wt % and most preferably none of the monofunctional and polyfunctional polymerizable compounds include a methacrylate as polymerizable group. By limiting the presence of methacrylate as polymerizable group to the above ranges of monofunctional and polyfunctional polymerizable compounds advantageously influences the curing speed.

In a preferred embodiment of the radiation curable white inkjet ink, at least 50 wt %, preferably 60 wt %, more preferably 70 wt % and most preferably 80 wt % of the monofunctional and polyfunctional polymerizable compounds include an acrylate as polymerizable group. The presence of acrylate as polymerizable group in the above ranges of monofunctional and polyfunctional polymerizable compounds advantageously influences the curing speed.

In a preferred embodiment of the radiation curable white inkjet ink, wherein a photoinitiator in the radiation curable white inkjet ink includes one or more acylphosphine oxides. The use of acylphosphine oxides have an advantage in that photo yellowing is minimized upon UV curing. This is especially advantageous for white and cyan inkjet inks, which otherwise would have a slightly yellowish respectively greenish hue.

In a preferred embodiment of the radiation curable white inkjet ink, the white pigment includes titanium dioxide. Such pigments maximize opacity.

In a preferred embodiment of the radiation curable white inkjet ink, the white pigment is present in amount between 18.5 wt % and 27.0 wt % based on the total weight of the radiation curable white inkjet ink. In the above range, a further improvement in flexing is observed as the ink layer thickness decreases.

In a preferred embodiment of the radiation curable white inkjet ink, the polymerizable composition is between 50.0 and 70.0 wt % of the total weight of the radiation curable white inkjet ink.

In a preferred embodiment of the radiation curable white inkjet ink, the polymerizable compounds other than those in groups i=1 to 18 are present in amount of no more than 15.0 wt %, preferably no more than 9.0 wt %, more preferably no more than 4.0 wt %, and most preferably 0 wt %.

In a preferred embodiment of the radiation curable white inkjet ink, the one or more oligomers are present in an amount of 0 to 12.0 wt %, preferably in an amount of 0 to 8.0 wt %, more preferably in an amount of 0 to 6.0 wt %, and most preferably in an amount of 0 to 4.0 wt %. In these ranges flexing can be more easily optimized without increasing viscosity too much.

In a preferred embodiment of the radiation curable white inkjet ink, the one or more oligomers preferably have a glass transition temperature of no more than 30° C.

In a preferred embodiment of the radiation curable white inkjet ink, the one or more oligomers are urethane acrylate oligomers and polyester acrylate oligomers, preferably with a glass transition temperature of no more than 30° C.

In a preferred embodiment of the radiation curable white inkjet ink, the viscosity of the radiation curable inkjet inks is between 5 and 16 mPa·s, preferably between 8 and 15 mPa·s at 45° C. and a shear rate of $1,000\ s^{-1}$. In such a range, the printing reliability improves.

There is no limitation in combining any of the above preferred embodiments with each other.

Radiation Curable Inkjet Ink Sets

The radiation curable white inkjet ink is preferably part of an inkjet ink set including a plurality of radiation curable inkjet inks containing a colour pigment.

In a preferred embodiment of the inkjet ink set, the plurality of radiation curable inkjet inks containing a colour pigment have a polymerizable composition as described above for the radiation curable white inkjet ink, There is no limitation in combining any of the above preferred embodiments with each other.

White Pigments

There is no actual limitation on the type of white pigment used, but preferably an inorganic white pigment is used having a refractive index greater than 1.60, preferably greater than 2.00, more preferably greater than 2.50 and most preferably greater than 2.60. The white pigments may be employed singly or in combination. Having the above refractive index, the dry thickness of the white ink layer can be minimized which is beneficial for flexibility.

The white pigment may be employed singly or in combination. Preferably titanium dioxide is used for the pigment with a refractive index greater than 1.60.

TABLE 1

| C.I. Number | Chemical name | CAS RN |
| --- | --- | --- |
| Pigment white 1 | Lead hydroxide carbonate | 1319-46-6 |
| Pigment white 3 | Lead sulfate | 7446-14-2 |
| Pigment white 4 | Zinc oxide | 1314-13-2 |
| Pigment white 5 | Lithopone | 1345-05-7 |
| Pigment white 6 | Titanium dioxide | 13463-67-7 |
| Pigment white 7 | Zinc sulfide | 1314-98-3 |
| Pigment white 10 | Barium carbonate | 513-77-9 |
| Pigment white 11 | Antimony trioxide | 1309-64-4 |
| Pigment white 12 | Zirconium oxide | 1314-23-4 |
| Pigment white 14 | Bismuth oxychloride | 7787-59-9 |
| Pigment white 17 | Bismuth subnitrate | 1304-85-4 |
| Pigment white 18 | Calcium carbonate | 471-34-1 |
| Pigment white 19 | Kaolin | 1332-58-7 |
| Pigment white 21 | Barium sulfate | 7727-43-7 |
| Pigment white 24 | Aluminum hydroxide | 21645-51-2 |
| Pigment white 25 | Calcium sulfate | 7778-18-9 |
| Pigment white 27 | Silicon dioxide | 7631-86-9 |
| Pigment white 28 | Calcium metasilicate | 10101-39-0 |
| Pigment white 32 | Zinc phosphate cement | 7779-90-0 |

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink. A titanium dioxide pigment, such as rutile, is particularly preferred for the white pigment.

For surface treatment of the titanium oxide, an aqueous treatment or a gas phase treatment is applied, and an alumina-silica treating agent is usually employed. Untreated-, alumina treated- or alumina-silica treated-titanium oxide are employable. Alone or in addition to the previous surface treatments, an organic surface treatment may be used.

In a preferred embodiment, the white pigment is present in the radiation curable white inkjet ink in an amount of at least 18.5 wt %, preferably 19.5 to 27.0 wt %, more preferably 20.5 to 26.0 wt % and most preferably 21.5 to 25.0 wt % based on the total weight of the radiation curable inkjet ink.

In a preferred embodiment, the polymerizable composition is between 50.0 and 70.0 wt %, preferably 60.0 to 68.0 wt % of the total weight of the radiation curable white inkjet ink.

The numeric average particle diameter of the titanium oxide or other white pigments is preferably from 180 to 400 nm, more preferably from 200 to 300 nm, and most preferably from 220 or 280 nm. Sufficient hiding power cannot be obtained when the average diameter is less than 180 nm, and the storage ability and the jet-out suitability of the ink tend to be degraded when the average diameter exceeds 400 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Colorants

The radiation curable inkjet ink contains a colorant. The colorant may be dyes, pigments or a combination thereof. Organic and/or inorganic pigments may be used. The colorant is preferably a pigment or a polymeric dye, most preferably a pigment.

The radiation curable inkjet inks preferably contain organic colour pigments as they allow for obtaining a high colour gamut on natural leather. Carbon black and titanium dioxide are inorganic pigments, which can be advantageously used in the present invention for composing black respectively white pigmented inkjet inks.

The colour pigments may be black, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley-VCH, 2004. ISBN 3527305769.

The colour pigments may be inorganic or organic, but for colour other than black they are preferably organic colour pigments. The latter provide for a higher colour gamut than inorganic pigments.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213. For colour gamut and light stability, most preferably pigments for a yellow inkjet ink are selected from the group consisting of C.I. Pigment Yellow 120, 139, 150, 151, 155, 180, 213 and mixed crystals thereof. The latter provide for good colour reproduction and light stability.

Particular preferred pigments are C.I. Pigment Red 17, 22, 23, 41, 48:1, 48:2, 49:1, 49:2, 52:1, 57:1, 88, 112, 122, 144, 146, 149, 170, 175, 176, 184, 185, 188, 202, 206, 207, 210, 216, 221, 248, 251, 254, 255, 264, 266, 270 and 272.

Particular preferred pigments are C.I. Pigment Violet 19, 23, 32, and 37.

For colour gamut and light stability, most preferably pigments for a magenta or red inkjet ink are selected from the group consisting of CI Pigment Violet 19, C.I. Pigment Red 122, 176, 202 and 254, as well as mixed crystals containing one of the foregoing. The latter provide for good colour reproduction and light stability.

Particular preferred pigments are C.I. Pigment Blue 15:1, 15:2, 15:3, 15:4, 15:6, 16, 56, 61 and (bridged) aluminium phthalocyanine pigments. For colour gamut and light stability, most preferably C.I. Pigment Blue 15:3, or 15:4 is selected. The latter provide for good light stability.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from BASF AG.

Carbon black is preferred as a black pigment. Suitable black pigments include carbon blacks such as Pigment Black 7 (e.g. Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. In a preferred embodiment, the carbon black pigment used is a pigment having less than 0.15% of toluene-extractable fraction using the method as described in section III, paragraph 5 of the Resolution AP(89) 1 dated 13 Sep. 1989 published by the Council of Europe.

It is also possible to make mixtures of pigments. For example, in a preferred embodiment a neutral black inkjet ink is used. Such a black inkjet ink is preferably obtained by mixing a black pigment and a cyan and/or magenta pigment into the ink.

Another object of the present invention is an inkjet ink set including further to the radiation curable white inkjet ink at least a radiation curable inkjet ink containing a beta-copper phthalocyanine pigment, a radiation curable inkjet ink containing a quinacridone pigment or a diketopyrrolo pyrrole pigment or a mixed crystal thereof, a radiation curable inkjet ink containing a carbon black pigment and a radiation curable inkjet ink containing a yellow pigment selected from the group consisting of C.I. Pigment Yellow 120, C.I. Pigment Yellow 139, C.I. Pigment Yellow 150, C.I. Pigment Yellow 155, C.I. Pigment 180, C.I. Pigment Yellow 185 and C.I. Pigment Yellow 213 or a mixed crystal thereof. Such an inkjet ink set allows to maximize colour gamut and light fastness.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness, while an average particle size larger than 0.200 µm reduces the colour gamut.

The numeric average pigment particle size of pigment particles is best determined with a Brookhaven Instruments Particle Sizer B190plus based upon the principle of dynamic light scattering. The ink is then diluted, for example, with ethyl acetate to a pigment concentration of 0.002 wt %. The measurement settings of the B190plus are: 5 runs at 23° C., angle of 90°, wavelength of 635 nm and graphics=correction function.

Dispersants

Pigments are usually stabilized in the dispersion medium of polymerizable compounds by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

In the preferred embodiment, the pigment is stabilized by a polymeric dispersant.

The pigment is preferably used in a concentrated pigment dispersion for preparing inkjet inks in an amount of 10 to 40 wt %, more preferably of 15 to 30 wt % based on the total weight of the pigment dispersion. The concentrated pigment dispersion is then diluted into a radiation curable inkjet ink.

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

The polymeric dispersant has preferably a number average molecular weight Mn between 500 and 30000, more preferably between 1500 and 10000. Larger molecular weight dispersants tend to increase the viscosity of the ink too much without adequately providing good dispersion stability.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from LUBRIZOL;
TEGO™ DISPERS™ dispersants from EVONIK;
EDAPLAN™ dispersants from MUNZING CHEMIE;
ETHACRYL™ dispersants from LYONDELL;
GANEX™ dispersants from ISP;
DISPEX™ and EFKA™ dispersants from BASF;
DISPONER™ dispersants from DEUCHEM.

Particularly preferred polymeric dispersants include Solsperse™ dispersants from LUBRIZOL, Efka™ dispersants from BASF and Disperbyk™ dispersants from BYK CHEMIE GMBH. Particularly preferred dispersants are Solsperse™ 32000, 35000 and 39000 dispersants from LUBRIZOL.

The polymeric dispersant is preferably used in an amount of 2 to 300 wt %, more preferably 10 to 100 wt %, most preferably 50 to 90 wt % based on the weight of the pigment.

An amount between 2 and 90 wt % provides for a good dispersion stability in combination with minimal effect on the ink viscosity.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The dispersion synergist is preferably added in a smaller amount than the polymeric dispersant(s). The ratio of polymeric dispersant/dispersion synergist depends upon the pigment and should be determined experimentally. Typically, the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from LUBRIZOL.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from LUBRIZOL is preferred. Suitable dispersion synergists for yellow inkjet inks include those disclosed in EP 1790697 A (AGFA GRAPHICS).

Photoinitiators and Co-Initiators

The radiation curable inkjet ink is preferably a UV curable inkjet ink. UV curable inkjet inks contain one or more photoinitiators, preferably one or more free radical photoinitiators. A free radical photoinitiator is a chemical compound that initiates polymerization of monomers and oligomers when exposed to actinic radiation by the formation of a free radical.

Two types of radical photoinitiators can be distinguished. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable colourless inkjet liquid may additionally contain co-initiators. Suitable examples of co-initiators can be categorized in three groups:
 (1) tertiary aliphatic amines such as methyldiethanolamine, dimethylethanolamine, triethanolamine, triethylamine and N-methylmorpholine;
 (2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino) benzoate; and
 (3) (meth)acrylated amines such as dialkylamino alkyl (meth)acrylates (e.g., diethylaminoethylacrylate) or N-morpholinoalkyl-(meth)acrylates (e.g., N-morpholinoethyl-acrylate).

The preferred co-initiators are aminobenzoates.

Suitable photo-initiators are disclosed in CRIVELLO, J. V., et al. VOLUME III. Photoinitiators for Free Radical Cationic. 2nd edition. Edited by BRADLEY, G. London, UK: John Wiley and Sons Ltd, 1998. p. 287-294.

In a preferred embodiment, the photoinitiator in the radiation curable inkjet ink includes one or more acylphosphine oxides. Preferred acylphosphine oxide photoinitiators include 2,4,6-trimethylbenzoyl-diphenyl-phosphine oxide available as a Darocur™ TPO (manufactured by BASF); and bis(2,4,6-trimethylbenzoyl)-phenyl phosphine oxide available as Irgacure™ 819 (manufactured by BASF).

In a preferred embodiment, the UV curable white inkjet ink includes no thioxanthone type photoinitiator. UV curable white inkjet inks including thioxanthone type photoinitiators generally exhibit undesired photoyellowing.

Specific examples of photo-initiators for the colour and white inkjet inks may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4,6 trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX, Lucerin™ TPO, all available from BASF, Esacure™ KT046, Esacure™ KIP150, Esacure™ KT37 and Esacure™ EDB available from LAMBERT), H-Nu™ 470 and H-Nu™ 470X available from SPECTRA GROUP Ltd.

The photoinitiator may be polymerizable photoinitiator, including one or more polymerizable groups, preferably acrylate groups.

The co-initiator may be polymerizable co-initiator, including one or more polymerizable groups, preferably acrylate groups A preferred amount of photoinitiator is 0 to 30 wt %, more preferably 0.5 to 20 wt %, and most preferably 1.0 to 10 wt % of the total weight of the UV curable inkjet ink.

The UV curable inkjet ink preferably comprises the co-initiator in an amount of 0.1 to 30 wt %, more preferably in an amount of 0.5 to 25 wt %, most preferably in an amount of 1 to 10 wt % of the total weight of the UV curable inkjet ink.

Surfactants

The radiation curable inkjet ink may contain at least one surfactant. The surfactant can be anionic, cationic, non-ionic, or zwitter-ionic and is preferably added in a total quantity less than 3 wt %, more preferably less than 2 wt %, and most preferably no more than 1 wt % based on the total weight of the radiation curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie and Tegoglide™ 410 from EVONIK.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Polymerization Inhibitors

The radiation curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from BASF; Floorstab™ UV range (UV-1, UV-2, UV-5 and UV-8) from Kromachem Ltd, Additol™ S range (S100, S110, S120 and 5130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total radiation curable inkjet ink.

In a preferred embodiment, the polymerization inhibitor is a polymerizable inhibitor, preferably containing one or more acrylate groups for achieving good reactivity.

Manufacturing Methods of Radiation Curable White Inkjet Inks

Pigment dispersions may be prepared by precipitating or milling the pigment in the dispersion medium in the presence of the dispersant.

A method of manufacturing a radiation curable white inkjet ink including the steps of: a) milling a colour pigment in the presence of a polymeric dispersant and a polymerizable compound into a concentrated pigment dispersion; and b) diluting the concentrated pigment dispersion with polymerizable compounds so that a polymerizable composition is obtained as disclosed above for the radiation curable white inkjet ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is preferably performed with cooling to prevent build up of heat, and as much as possible under light conditions in which actinic radiation has been substantially excluded.

The pigment dispersion may contain more than one pigment. Such a pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Inkjet Printing Methods

In the present invention, the inkjet printing method includes the steps of: jetting a radiation curable white inkjet ink on a substrate; and curing the radiation curable white inkjet ink jetted on the substrate.

There is no limitation on the type of substrate, but the substrate is preferably selected from natural leather and tarpaulin. On the latter substrates the advantages of the radiation curable inkjet inks of the invention are most noticeably observed for flexing.

A tarpaulin or tarp is a large flexible sheet of water-resistant material. In Australia, a tarp may be known as a hootch. Tarpaulins often have reinforced grommets at the corners and along the sides to form attachment points for rope, allowing them to be tied down or suspended. The latter is advantageously exploited for truck curtains in so-called tautliners.

Preferred tarpaulins are selected from the group consisting of woven polyethylene, canvas, polyester coated with polyurethane, vinyl tarpaulins and silnylon.

In a preferred embodiment, the tarpaulin has a thickness of at least 130 μm, preferably at least 180 μm, more preferably 230 μm to 600 μm. A thickness of 230 μm allows for heavy duty flexing.

Natural leather comes in different grades, such as full grain, top grain (25) which is essentially full-grain but with part of the grain layer sanded and the underlying split layer removed, and split leather. For the latter, the underlying layer of the cowhide is removed and used to create split leather. Depending on the thickness of the underlying layer, many splits can be created. Split leather has a rough appearance and is usually used to make suede.

For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

In a preferred embodiment, the one or more radiation curable inkjet inks are jetted on a base coat present on the leather surface. The base coat not only masks imperfections of the leather such as bite and scratch marks, but also provides a homogeneous flat surface improving the image quality.

In the present invention, the natural leather used as substrate for inkjet printing is preferably crusted leather, more preferably crusted leather coated with a base coat. The base coat preferably includes a polymer or copolymer based on polyurethane, as this has been found to improve flexibility to the printed leather.

The base coat preferably has a colour similar to that of the corium and the grain. Any desired colour may be chosen for the corium or grain and the base coat, such as red, green, brown, black, blue . . . . The corium and grain is usually dyed by dyes during the crusting phase, while preferably colour pigments are included in the base coat.

The base coat may be applied as a single layer, or may be applied as multiple layers. The multiple layers may even have a different composition for improving properties like adhesion or flexibility.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the base coat is preferably in the range of 1 to 6 g/m².

Although polyurethanes and/or polyamides are preferred as the polymers for the base" coat, other polymers may be used preferably in combination with the polyurethanes and/or polyamides. Such polymers preferably have an elongation at break of more than 200%, more preferably 300%. The elongation at break is measured according to ISO527-2, for example, with a MTS Exceed™ testing apparatus from MTS Systems Corporation.

Another type of preferred polymers to be used in the base coat are polyacrylates. Polyacrylates provide good flexibility and stabilize pigment dispersions in the base coat.

In a preferred embodiment, the base coat includes a polymer or copolymer based on polyurethane and a polymer or copolymer based on a polyacrylate. Such a combination brings excellent flexibility even in the presence of pigments.

Preferred polyacrylates are Roda™ Base 5514 from TFL and Primal™ HPB980 from LANXESS. A suitable polymeric acrylate emulsion is Bioflex™ KGA from LMF Biokimica.

A cross-linker may be incorporated in the base coat to improve the strength of the base coat and the adhesion to crust leather. Preferred cross-linkers include aldehyde based cross-linkers such as formaldehyde, melamine formaldehyde derivatives, urea formaldehyde resins, glyoxal and gluraraldehyde, epoxides, oxazolines, carbodiimides and isocyanates, isocyanates being particularly preferred. The dry weight of the cross-linker in the base coat is preferably less than 1.4 g/m², more preferably less than 1.0 g/m².

In a preferred embodiment of manufacturing decorated leather, a protective topcoat is applied to the inkjet printed decorative image after at least partially curing the one or more radiation curable inkjet inks of the invention jetted on the leather surface. The topcoat prevents the decorative image against scratches when used in the leather article.

In a preferred embodiment, the base coat and/or protective top coat includes a polymer or copolymer based on polyurethane.

In a preferred embodiment of manufacturing decorated leather, a heat pressing step and/or an embossing step is applied. A heat pressing step presses the base coat/ink layer/topcoat sandwich into the leather providing improved robustness. An embossing step allows to imitate, for example, expensive snake skin leather for a handbag while using bovine leather.

In a preferred embodiment, the leather surface is the surface of a crusted leather. Crusted leather provides for the best quality leather end-product, which adds to the desired luxurious feeling of decorated leather articles.

The base coat and top coat are preferably applied by spraying, but may be applied by any coating technique known, such as knife coating, extrusion coating, slide hopper coating and curtain coating.

The top coat may be applied as a single layer, or may be applied as multiple layers. The multiple layers may even have a different composition for improving properties like scratch resistance.

The protective top coat may have the same or a similar composition as the base coat, but preferably does not include any colorants so that the inkjet printed colour image remains unaffected. Usually the protective top coat is somewhat optimized according to the leather application. For example, flexibility does not play an important role for a leather book cover contrary to leather shoes. Hence, the protective top coat for a book cover may be optimized towards scratch resistance.

The top coat is most preferably a transparent top coat, but may be a translucent top coat. By having a transparent top coat, the inkjet printed image is clearly visible through the top coat. By using a translucent top coat, a special aesthetic effect is created.

If a matt top surface is desired for the inkjet printed leather, a matting agent may be included. Any suitable matting may be used. Preferred matting agent include silica. A preferred commercially available example of a silica dispersion is Euderm™ SN2 from LANXESS The decorated natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books, stationary, interior decoration, packaging, equestrian articles, and the like.

There is no limitation in combining any of the above preferred embodiments with each other.

Inkjet Printing Devices

The radiation curable inkjet inks may be jetted by one or more print heads ejecting small droplets of ink in a controlled manner through nozzles onto an ink-receiver surface, which is moving relative to the print head(s).

A preferred print head for an inkjet printing system in the present invention is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, the inkjet printing method in the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process, the inkjet print heads usually remain stationary and the ink-receiver surface is transported under the inkjet print heads.

Curing Devices

The radiation curable inkjet inks in the present invention are cured by exposing them to actinic radiation, preferably to ultraviolet radiation.

In inkjet printing, the curing means may be arranged in combination with the print head of the inkjet printer, travelling therewith so that the curable composition is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fiber optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm

UV-B: 320 nm to 290 nm

UV-C: 290 nm to 100 nm.

It is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

In a preferred embodiment, the inkjet printing device contains UV LEDs with a wavelength larger than 360 nm, preferably UV LEDs with a wavelength larger than 380 nm, and most preferably UV LEDs with a wavelength of about 395 nm.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Aldrich Chemical Co. (Belgium) and Acros (Belgium) unless otherwise specified. The water used was demineralized water.

TiO2 is a titanium dioxide pigment available as Tronox™ CR834 from TRONOX PIGMENTS BV.

PB15:4 is an abbreviation used for Hostaperm™ Blue P-BFS, a C.I. Pigment Blue 15:4 pigment from CLARIANT.

PR122 is a quinacridone pigment available as PIGMENT RED 122 TCR 12203 IJ from TRUST CHEM EUROPE BV.

MP1 is an abbreviation used for a quinacridone pigment available as Fastogen™ super magenta CBR5 from SUN CHEMICAL BV.

PY155 is a C.I. Pigment Yellow 155 pigment for which Inkjet™ Yellow 4GC from CLARIANT was used.

PB7 is an abbreviation used for SpecialBlack™ 550, which is a carbon black available from EVONIK DEGUSSA.

SYN is the dispersion synergist according to Formula (A):

Formula (A)

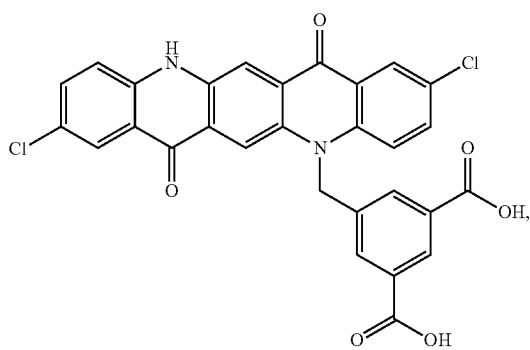

and was synthesized in the same manner as described in Example 1 of WO 2007/060254 (AGFA GRAPHICS) for the synergist QAD-3.

E7701 is a polyacrylate dispersant available as Efka™ 7701 from BASF.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed.

PEA is 2-phenoxyethyl acrylate available as Sartomer™ SR339C from ARKEMA.

VCL is N-vinyl caprolactam available from BASF BELGIUM, NV.

TBCH is 4-tert.butylcyclohexylacrylate available under the trade name of Sartomer CD217 from ARKEMA.

CD278 is di-ethyleneglycolbutyletheracrylate available as Sartomer™ CD278 from ARKEMA.

IDA is isodecyl acrylate available as Sartomer™ SR395 from ARKEMA.

SR495B is a Caprolactone acrylate monomer available as Sartomer™ SR495B from ARKEMA.

G1122 is a monofunctional urethane acrylate available as Genomer™ 1122 from RAHN having the Formula (B):

Formula (B)

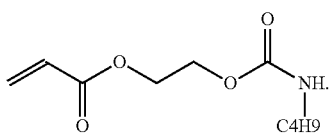

PEG200 is polyethyleneglycol 200 diacrylate available as Sartomer™ SR259 from ARKEMA.

PEG400 is polyethyleneglycol 400 diacrylate available as Sartomer™ SR344 from ARKEMA.

PEG600 is polyethyleneglycol 600 diacrylate available as Sartomer™ SR610 from ARKEMA.

DPGDA is dipropylene glycol diacrylate available as Sartomer™ SR508 from ARKEMA.

SR9003 is propoxylated neopentyl glycol diacrylate available as Sartomer™ SR9003 from ARKEMA.

MPDA is 3-methyl 1,5-pentanediol diacrylate available as Sartomer™ SRTG341 from ARKEMA.

CN131B is 2-hydroxy-3-phenoxypropylacrylate available as Sartomer™ CN131B from ARKEMA.

CN963B80 is a urethane acrylate oligomer available as Sartomer™ CN963B80 from ARKEMA.

CN966H90 is a urethane acrylate oligomer available as Sartomer™ CN966H90 from ARKEMA.

KT046 is a mixture of photoinitiators available as Esacure™ KTO 46 from FRATELLI LAMBERTI SPA.

BAPO is a bis(2,4,6-trimethylbenzoyl)-phenylphosphineoxide photoinitiator available as Irgacure™ 819 from BASF.

TPO is trimethylbenzoyl diphenyl phosphine oxide supplied as Omnirad™ TPO by IGM.

ITX is Darocur™ ITX is an isomeric mixture of 2- and 4-isopropyl thioxanthone from BASF.

T410 is a silicone surfactant available as Tegoglide™ 410 from EVONIK.

C7500 is a silicone surfactant available as Silwet™ L7500 from OSI SPECIALITIES BENELUX NV INHIB is a mixture forming a polymerization inhibitor having a composition according to Table 2.

TABLE 2

| Component | wt % |
|---|---|
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

STAB UV10 is 4-hydroxy-2,2,6,6-tetramethylpiperidinooxy sebacate available as Irgastab™ UV 10 from BASF.

PA is an anionic polyamide dispersion available as Michem™ Emulsion D310 from MICHELMAN PU is a waterbased polyurethane dispersion available as Urepal™ PU147 from CHEMIPAL S.p.A.

XL is a solvent-based aliphatic polyisocyanate available as Urepal™ CT70 from CHEMIPAL S.p.A.

RL-1 is a red leather obtained from Conceria Nuti Ivo S.P.A. (Italy), which is a red dyed bovine leather crust coated with a red pigmented base coat including an aqueous polyurethane dispersion.

Measurement Methods

1. Viscosity

The viscosity of the UV curable inkjet inks was measured at 45° C. and at a shear rate of 1,000 s$^{-1}$ using a Rotovisco™ RV1 viscometer from HAAKE.

2. Surface Tension

The static surface tension of the UV curable inkjet inks was measured with a KRÜSS tensiometer K9 from KRÜSS GmbH, Germany at 25° C. after 60 seconds.

3. Average Particle Size of Concentrated Pigment Dispersion (Malvern)

The average particle size of pigment particles in concentrated pigment dispersions was determined by photon correlation spectroscopy at a wavelength of 633 nm with a 4 mW HeNe laser on a diluted sample of the pigmented inkjet ink. The particle size analyzer used was a Malvern™ nano-S available from Goffin-Meyvis.

The sample was prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

4. Average Particle Size

The average particle size (diameter) was determined with a Brookhaven Instruments Particle Sizer BI90plus based upon the principle of dynamic light scattering. The inkjet ink was diluted with ethyl acetate to a pigment concentration of 0.002 wt %. The measurement settings of the BI90plus were: 5 runs at 23° C., angle of 90°, wavelength of 635 nm and graphics=correction function.

5. Dry Flexing (Leather)

The flexibility was determined on a SATRA™ STM 701 Bally flexometer wherein samples had to endure a cycle of a multiple of 10,000 flexes. The amount of cracks in the leather or tarpaulin after the test determines the score. The cracks are evaluated by the naked eye and by a microscope at a 8× magnification according to a criterion shown in Table 3.

TABLE 3

| Score | Criterion |
|---|---|
| OK | No cracks visible by the naked eye. No or almost no cracks visible by microscope |
| NOK | Cracks clearly visible by the naked eye. Sometimes even pealing-off of the ink layer. |

6. Dry Flexing (Tarpaulin)

The flexibility was determined with a Flex Cracking Test Machine from KARL SCHRODER KG according to DIN 53359 on test samples having as dimension 20×40 mm.

The evaluation is performed according to Table 4.

TABLE 4

| Score | Criterion |
|---|---|
| OK | No cracks visible by the naked eye. No or almost no cracks visible by microscope/magnifying glass |
| NOK | Cracks clearly visible by the naked eye. Sometimes even pealing-off of the ink layer. |

Example 1

This example illustrates the decoration of natural leather with a decorative image using radiation curable white inkjet inks with a specific composition for preventing cracking of the cured ink layer upon flexing.

Preparation of White Inkjet Inks

A concentrated white pigment dispersion W1 was prepared having a composition according to Table 5.

TABLE 5

| wt % of: | W1 |
|---|---|
| TiO2 | 50.0 |
| E7701 | 4.0 |
| INHIB | 1.0 |
| PEA | 45.0 |

The concentrated white pigment dispersion W1 was prepared by mixing the ingredients of Table 4 for 30 minutes in a vessel equipped with a DISPERLUX™ disperser (from DISPERLUX S.A.R.L., Luxembourg). The polymeric dispersant E7701 was added as a 30% solution in PEA. This mixture was subsequently milled in a DYNO™-MILL ECM Poly from the company WAB Willy A. Bachofen (Switzerland) using 0.40 mm yttrium-stabilized zirconium oxide-beads. The bead mill was filled for 42% with the grinding beads and operated in recirculation mode with a residence time of 10 minutes and using a tip speed of 15 m/s. The milling chamber is water-cooled during the operation. The average particle size of pigment particles in concentrated pigment dispersions was found to be 280 nm.

The concentrated white pigment dispersion W1 was then mixed with the components as shown in Table 5 to Table 9 for producing the inventive UV curable white inkjet inks INV-1 to INV-28 and the comparative UV curable white inkjet inks COMP-1 to COMP-5.

TABLE 6

| wt % of | INV-1 | INV-2 | INV-3 | INV-4 | INV-5 | INV-6 | INV-7 |
|---|---|---|---|---|---|---|---|
| TiO2 | 24.00 | 32.00 | 24.00 | 24.00 | 24.00 | 24.00 | 24.00 |
| E7701 | 1.92 | 2.56 | 1.92 | 1.92 | 1.92 | 1.92 | 1.92 |
| PEA | 21.60 | 28.80 | 21.60 | 56.39 | 27.60 | 21.60 | 21.6 |
| VCL | 16.00 | 14.00 | 16.00 | 0.00 | 0.00 | 16.00 | 16.00 |
| TBCH | 0.00 | 0.00 | 0.00 | 7.00 | 0.00 | 0.00 | 0.00 |
| CD278 | 0.00 | 0.00 | 11.95 | 18.23 | 0.00 | 0.00 | 0.00 |
| IDA | 18.23 | 0.00 | 0.00 | 0.00 | 18.23 | 10.00 | 18.23 |
| SR495B | 0.00 | 0.00 | 0.00 | 0.00 | 10.00 | 8.23 | 0.00 |
| G1122 | 10.00 | 2.44 | 10.00 | 2.44 | 10.00 | 10.00 | 10.00 |
| KT046 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 7

| wt % of | INV-8 | INV-9 | INV-10 | INV-11 | INV-12 | INV-13 | INV-14 |
|---|---|---|---|---|---|---|---|
| TiO2 | 24.00 | 24.00 | 24.00 | 24.00 | 24.00 | 24.00 | 24.00 |
| E7701 | 1.92 | 1.92 | 1.92 | 1.92 | 1.92 | 1.92 | 1.92 |
| PEA | 21.60 | 21.60 | 21.60 | 21.60 | 21.60 | 21.60 | 21.60 |
| VCL | 16.00 | 12.00 | 8.00 | 4.00 | 0.00 | 13.00 | 9.00 |
| TBCH | 0.00 | 0.00 | 4.00 | 8.00 | 12.00 | 0.00 | 0.00 |
| IDA | 10.00 | 18.23 | 18.23 | 18.23 | 18.23 | 16.23 | 16.23 |
| SR495B | 8.23 | 0.00 | 0.00 | 0.00 | 0.00 | 0.00 | 0.00 |
| G1122 | 10.00 | 14.00 | 14.00 | 14.00 | 14.00 | 10.00 | 14.00 |
| PEG400 | 0.00 | 0.00 | 0.00 | 0.00 | 0.00 | 5.00 | 5.00 |
| KT046 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 8

| wt % of | INV-15 | INV-16 | INV-17 | INV-18 | INV-19 | INV-20 | INV-21 |
|---|---|---|---|---|---|---|---|
| TiO2 | 24.00 | 24.00 | 24.00 | 24.00 | 24.00 | 24.00 | 24.00 |
| E7701 | 1.92 | 1.92 | 1.92 | 1.92 | 1.92 | 1.92 | 1.92 |
| PEA | 21.60 | 21.60 | 21.60 | 21.60 | 21.60 | 21.60 | 21.60 |
| VCL | 9.00 | 11.00 | 14.00 | 12.00 | 14.50 | 13.00 | 15.00 |
| IDA | 16.23 | 18.23 | 9.50 | 9.00 | 9.00 | 8.00 | 8.50 |
| SR495B | 0.00 | 0.00 | 8.23 | 8.23 | 8.23 | 8.23 | 8.23 |
| G1122 | 14.00 | 10.00 | 10.00 | 10.00 | 10.00 | 10.00 | 10.00 |
| DPGDA | 0.00 | 5.00 | 2.50 | 5.00 | 0.00 | 0.00 | 0.00 |
| MPDA | 0.00 | 0.00 | 0.00 | 0.00 | 2.50 | 5.00 | 0.00 |
| PEG200 | 0.00 | 0.00 | 0.00 | 0.00 | 0.00 | 0.00 | 2.50 |
| PEG400 | 5.00 | 0.00 | 0.00 | 0.00 | 0.00 | 0.00 | 0.00 |
| KT046 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 9

| wt % of | INV-22 | INV-23 | INV-24 | INV-25 | INV-26 | INV-27 | INV-28 |
|---|---|---|---|---|---|---|---|
| TiO2 | 24.00 | 24.00 | 24.00 | 24.00 | 24.00 | 32.00 | 24.00 |
| E7701 | 1.92 | 1.92 | 1.92 | 1.92 | 1.92 | 2.56 | 1.92 |

TABLE 9-continued

| wt % of | INV-22 | INV-23 | INV-24 | INV-25 | INV-26 | INV-27 | INV-28 |
|---|---|---|---|---|---|---|---|
| PEA | 21.60 | 21.60 | 21.60 | 21.60 | 21.60 | 28.80 | 30.10 |
| VCL | 14.00 | 15.00 | 14.00 | 15.00 | 15.50 | 14.00 | 16.00 |
| IDA | 7.00 | 8.50 | 7.00 | 8.50 | 5.50 | 11.95 | 1.50 |
| SR495B | 8.23 | 8.23 | 8.23 | 8.23 | 8.23 | 0.00 | 8.23 |
| G1122 | 10.00 | 10.00 | 10.00 | 10.00 | 10.00 | 2.44 | 10.00 |
| PEG400 | 0.00 | 2.50 | 5.00 | 0.00 | 0.00 | 0.00 | 0.00 |
| PEG200 | 5.00 | 0.00 | 0.00 | 0.00 | 0.00 | 0.00 | 0.00 |
| PEG600 | 0.00 | 0.00 | 0.00 | 2.50 | 5.00 | 0.00 | 0.00 |
| KT046 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 10

| wt % of | COMP-1 | COMP-2 | COMP-3 | COMP-4 | COMP-5 |
|---|---|---|---|---|---|
| TiO2 | 16.00 | 24.00 | 24.00 | 24.00 | 24.00 |
| E7701 | 1.28 | 1.92 | 1.92 | 1.92 | 1.92 |
| PEA | 34.12 | 42.39 | 33.39 | 33.83 | 33.83 |
| VCL | 20.00 | 14.00 | 20.00 | 15.00 | 15.00 |
| IBOA | 0.00 | 0.00 | 0.00 | 15.00 | 15.00 |
| TBCH | 10.00 | 7.00 | 0.00 | 0.00 | 0.00 |
| IDA | 0.00 | 0.00 | 10.00 | 0.00 | 0.00 |
| SR9003 | 0.00 | 0.00 | 0.00 | 2.00 | 2.00 |
| G1122 | 6.00 | 2.44 | 2.44 | 0.00 | 0.00 |
| CN963B80 | 4.00 | 0.00 | 0.00 | 0.00 | 0.00 |
| KT046 | 4.00 | 4.00 | 4.00 | 4.00 | 4.00 |
| TPO | 2.95 | 2.95 | 2.95 | 2.95 | 2.95 |
| T410 | 0.30 | 0.30 | 0.30 | 0.30 | 0.30 |
| INHIB | 1.00 | 1.00 | 1.00 | 1.00 | 1.00 |
| STAB UV10 | 0.35 | 0.00 | 0.00 | 0.00 | 0.00 |

Results and Evaluation

The viscosity of the white inkjet inks was determined at 45° C. The Ink Composition Value ICV was calculated for each inkjet ink according to Formula (I). The "wt % Mono" and "wt % Poly" represent the weight percentages of the monofunctional polymerizable compounds respectively the polyfunctional polymerizable compounds, both based on the total weight of the polymerizable composition.

Each white inkjet ink was printed on a red leather RL-1 with an Anapurna™ M2540 flatbed inkjet printer equipped with a D-bulb curing system in wedges ranging from 10% to 100% ink coverage at 720×1440 dpi. Printed leather patches having the same opacity for the white inkjet ink were selected for dry flexing at 30,000 flexes.

All results are shown in Table 11.

TABLE 11

| White Ink | Viscosity | ICV | wt % TiO2 | wt % Mono | wt % Poly | Flexing |
|---|---|---|---|---|---|---|
| INV-1 | 7.7 | 22 | 24 | 98.8 | 1.2 | OK |
| INV-2 | 12.1 | 26 | 32 | 98.6 | 1.4 | OK |
| INV-3 | 8.9 | 19 | 24 | 98.8 | 1.2 | OK |
| INV-4 | 10.8 | 10 | 24 | 98.8 | 1.2 | OK |
| INV-5 | 11.8 | −21 | 24 | 98.8 | 1.2 | OK |
| INV-6 | 12.1 | 22 | 24 | 98.8 | 1.2 | OK |
| INV-7 | 10.9 | 24 | 24 | 97.5 | 2.5 | OK |
| INV-8 | 11.5 | 22 | 24 | 98.8 | 1.2 | OK |
| INV-9 | 8.2 | 13 | 24 | 98.8 | 1.2 | OK |
| INV-10 | 8.3 | 7 | 24 | 98.8 | 1.2 | OK |
| INV-11 | 8.4 | 1 | 24 | 98.8 | 1.2 | OK |
| INV-12 | 8.4 | −5 | 24 | 98.8 | 1.2 | OK |
| INV-13 | 9.2 | 15 | 24 | 91.3 | 8.7 | OK |
| INV-14 | 9.7 | 6 | 24 | 91.3 | 8.7 | OK |
| INV-15 | 10.3 | 5 | 24 | 91.3 | 8.7 | OK |
| INV-16 | 8.1 | 19 | 24 | 91.3 | 8.7 | OK |
| INV-17 | 10.2 | 22 | 24 | 95.0 | 5.0 | OK |
| INV-18 | 10.9 | 22 | 24 | 91.3 | 8.7 | OK |
| INV-19 | 10.7 | 22 | 24 | 95.0 | 5.0 | OK |
| INV-20 | 9.8 | 21 | 24 | 91.3 | 8.7 | OK |
| INV-21 | n.a. | 22 | 24 | 95.0 | 5.0 | OK |
| INV-22 | 11.1 | 21 | 24 | 91.3 | 8.7 | OK |
| INV-23 | 11.5 | 20 | 24 | 95.0 | 5.0 | OK |
| INV-24 | 11.5 | 18 | 24 | 91.3 | 8.7 | OK |
| INV-25 | 12.0 | 21 | 24 | 95.1 | 4.9 | OK |
| INV-26 | 12.8 | 21 | 24 | 91.3 | 8.7 | OK |
| INV-27 | 10.6 | 28 | 32 | 98.6 | 1.4 | OK |
| INV-28 | 13.2 | 30 | 24 | 98.8 | 1.2 | OK |
| COMP-1 | 10.0 | 51 | 16 | 98.8 | 1.2 | NOK |
| COMP-2 | 10.9 | 40 | 24 | 98.8 | 1.2 | NOK |
| COMP-3 | 8.3 | 39 | 24 | 98.8 | 1.2 | NOK |
| COMP-4 | 8.9 | 60 | 24 | 98.8 | 1.2 | NOK |
| COMP-5 | 11.5 | 60 | 24 | 98.8 | 1.2 | NOK |

From Table 11, it should be clear that only the inventive white inkjet inks can sustain a test of 30,000 flexes. The results for the radiation curable white inkjet inks INV-13 to INV-26 illustrate that even a substantial amount of polyfunctional polymerizable compounds may be present. Such amount improves the strength of the ink layer making it more scratch resistant. By increasing the content of titanium dioxide further to 32 wt % in the inkjet ink, flexing remain good even at an ICV of 28, as illustrated by the ink INV-27. The comparative radiation curable white inkjet inks were not capable of bearing 30,000 flexes even though the weight percentage of polyfunctional polymerizable compounds was minimized and the content of titanium dioxide increased to 24 wt % based on the ink.

Example 2

This example illustrates the inkjet printing of multicolour images on natural leather with a UV curable inkjet ink set that exhibits no cracking.

Concentrated Pigment Dispersions

First concentrated pigment dispersions were made for making a CMYK inkjet ink set.

Cyan Pigment Dispersion CPC

A dispersion was made by mixing the components according to Table 11 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 µm filter into a vessel.

TABLE 12

| Component | wt % |
|---|---|
| PB 15:4 | 25.00 |
| D162 | 10.00 |
| PEA | 63.67 |
| INHIB | 1.33 |

Magenta Pigment Dispersion CPM

A dispersion was made by mixing the components according to Table 12, for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel.

TABLE 13

| Component | wt % |
|---|---|
| PR122 | 20.00 |
| SYN | 1.00 |
| D162 | 10.00 |
| PEA | 67.67 |
| INHIB | 1.33 |

Yellow Pigment Dispersion CPY

A dispersion was made by mixing the components according to Table 13 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel.

TABLE 14

| Component | wt % |
|---|---|
| PY155 | 25.00 |
| D162 | 8.00 |
| PEA | 65.73 |
| INHIB | 1.27 |

Black Pigment Dispersion CPB

A dispersion was made by mixing the components according to Table 14 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel.

TABLE 15

| Component | wt % |
|---|---|
| PB 15:4 | 5.57 |
| MP1 | 3.89 |
| PB7 | 15.54 |
| SYN | 0.16 |
| D162 | 10.65 |
| PEA | 59.64 |
| DPGDA | 2.16 |
| INHIB | 2.40 |

UV Curable Inkjet Ink Set

A radiation curable CMYK inkjet ink sets was prepared using the above prepared concentrated pigment dispersions and combining them with the other components according to Table 16. The wt % is based on the total weight of the inkjet ink.

TABLE 16

| wt % of | Cyan | Magenta | Yellow | Black |
|---|---|---|---|---|
| CPC | 10.00 | — | — | — |
| CPM | — | 17.50 | — | — |
| CPY | — | — | 12.00 | — |
| CPB | — | — | — | 11.00 |
| VCL | 15.00 | 15.00 | 15.00 | 15.00 |
| PEA | 43.80 | 38.37 | 39.42 | 40.72 |
| IDA | 8.00 | 8.00 | 8.00 | 8.00 |
| SR495B | 10.00 | 10.00 | 10.00 | 10.00 |
| CN966H90 | 3.30 | 1.30 | 2.70 | 2.50 |
| ITX | — | — | 3.00 | 3.00 |
| TPO | 5.00 | 5.00 | 5.00 | 5.00 |
| BAPO | 2.90 | 2.90 | 2.90 | 2.90 |
| INHIB | 1.00 | 0.93 | 0.98 | 0.88 |
| C7500 | 1.00 | 1.00 | 1.00 | 1.00 |

Preparation of Protective Top Coat TC1

A protective top coat TC1 was prepared by mixing the following components according to Table 17.

TABLE 17

| Component | wt % |
|---|---|
| PA | 20.0 |
| PU | 50.0 |
| XL | 2.0 |
| Water | 28.0 |

Results and Evaluation

The properties of the inks in the radiation curable CMYK inkjet ink set were determined and are shown in Table 18.

TABLE 18

| Parameter | Cyan | Magenta | Yellow | Black |
|---|---|---|---|---|
| Viscosity (mPa · s) | 9.8 | 8.4 | 9.2 | 9.5 |
| Surface tension (mN/m) | 31.3 | 31.4 | 31.2 | 31.3 |
| Average Particle Size (nm) | 101 | 117 | 170 | 126 |
| ICV | 17 | 17 | 18 | 18 |
| wt % Mono | 83.17 | 83.21 | 80.31 | 80.28 |
| wt % Poly | 4.23 | 2.25 | 3.63 | 3.68 |

The white inkjet ink INV-6 of Example 1 was used for forming a radiation curable CMYKW inkjet ink set that was used for printing a multicolour image with a white background on a red leather RL-1 with an Anapurna™ M2540 flatbed inkjet printer equipped with a D-bulb curing system.

The inkjet printed leather was then spray coated with the protective top coat TC1 using a HS 25 HV3 spray gun from KRAUTZBERGER having a nozzle diameter of 1.2 mm. The coated leather was dried using a Radicure™ D dryer set to a temperature of 280° C. wherein the speed of the conveyor belt is set to the lowest value resulting in a drying time of 2.5 min.

Printed samples were taken from different areas in the multicolour printed leather and tested for flexing. All tested samples exhibited no cracks visible by the naked eye or by microscope at 30,000 flexes.

Example 3

This example illustrates inkjet printing on tarpaulin with radiation curable white inkjet inks having a specific composition for preventing cracking of the cured ink layer upon flexing.

Preparation of White Inkjet Inks

A concentrated white pigment dispersion W1 was used having the same composition as in Table 5 of Example 1. The concentrated white pigment dispersion W1 was then mixed with the components as shown in Table 19 to Table 23 for producing the inventive UV curable white inkjet inks I-1 to I-20 and the comparative UV curable white inkjet inks C-1 to C-14.

TABLE 19

| wt % of: | I-1 | I-2 | I-3 | I-4 | I-5 | I-6 |
|---|---|---|---|---|---|---|
| TiO2 | 32.00 | 24.00 | 24.00 | 24.00 | 24.00 | 24.00 |
| E7701 | 2.56 | 1.92 | 1.92 | 1.92 | 1.92 | 1.92 |
| PEA | 28.80 | 21.60 | 21.60 | 21.60 | 21.60 | 21.60 |
| VCL | 14.00 | 16.00 | 12.00 | 8.00 | 0.00 | 13.00 |
| TBCH | 0.00 | 0.00 | 0.00 | 4.00 | 12.00 | 0.00 |
| IDA | 11.95 | 10.00 | 18.23 | 18.23 | 18.23 | 16.23 |
| SR495B | 0.00 | 8.23 | 0.00 | 0.00 | 0.00 | 0.00 |
| G1122 | 2.44 | 10.00 | 14.00 | 14.00 | 14.00 | 10.00 |
| PEG400 | 0.00 | 0.00 | 0.00 | 0.00 | 0.00 | 5.00 |
| KT024 | 4.00 | 4.00 | 4.00 | 4.00 | 4.00 | 4.00 |
| TPO | 2.95 | 2.95 | 2.95 | 2.95 | 2.95 | 2.95 |
| T410 | 0.30 | 0.30 | 0.30 | 0.30 | 0.30 | 0.30 |
| INH1B | 1.00 | 1.00 | 1.00 | 1.00 | 1.00 | 1.00 |

TABLE 20

| wt % of: | I-7 | I-8 | I-9 | I-10 | I-11 | I-12 | I-13 |
|---|---|---|---|---|---|---|---|
| TiO2 | 24.00 | 24.00 | 24.00 | 24.00 | 24.00 | 24.00 | 24.00 |
| E7701 | 1.92 | 1.92 | 1.92 | 1.92 | 1.92 | 1.92 | 1.92 |
| PEA | 21.60 | 21.60 | 21.60 | 21.60 | 21.60 | 21.60 | 21.60 |
| VCL | 9.00 | 9.00 | 14.00 | 12.00 | 14.50 | 13.00 | 15.00 |
| IDA | 16.23 | 16.23 | 9.50 | 9.00 | 9.00 | 8.00 | 8.50 |
| SR495B | 0.00 | 0.00 | 8.23 | 8.23 | 8.23 | 8.23 | 8.23 |
| SR9003 | 0.00 | 0.00 | 0.00 | 0.00 | 0.00 | 0.00 | 0.00 |
| G1122 | 14.00 | 14.00 | 10.00 | 10.00 | 10.00 | 10.00 | 10.00 |
| DPGDA | 0.00 | 0.00 | 2.50 | 5.00 | 0.00 | 0.00 | 0.00 |
| MPDA | 0.00 | 0.00 | 0.00 | 0.00 | 2.50 | 5.00 | 0.00 |
| PEG400 | 5.00 | 0.00 | 0.00 | 0.00 | 0.00 | 0.00 | 0.00 |
| PEG200 | 0.00 | 0.00 | 0.00 | 0.00 | 0.00 | 0.00 | 2.50 |
| PEG600 | 0.00 | 5.00 | 0.00 | 0.00 | 0.00 | 0.00 | 0.00 |
| KT024 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 21

| wt % of: | I-14 | I-15 | I-16 | I-17 | I-18 | I-19 | I-20 |
|---|---|---|---|---|---|---|---|
| TiO2 | 24.00 | 24.00 | 24.00 | 24.00 | 24.00 | 24.00 | 24.00 |
| E7701 | 1.92 | 1.92 | 1.92 | 1.92 | 1.92 | 1.92 | 1.92 |
| PEA | 21.60 | 21.60 | 21.60 | 21.60 | 21.60 | 21.60 | 30.10 |
| VCL | 14.00 | 15.00 | 14.00 | 16.00 | 15.50 | 16.00 | 16.00 |
| IDA | 7.00 | 8.50 | 7.00 | 8.50 | 5.50 | 10.00 | 1.50 |
| SR495B | 8.23 | 8.23 | 8.23 | 8.23 | 8.23 | 8.23 | 8.23 |
| G1122 | 10.00 | 10.00 | 10.00 | 10.00 | 10.00 | 10.00 | 10.00 |
| PEG400 | 0.00 | 2.50 | 5.00 | 0.00 | 0.00 | 0.00 | 0.00 |
| PEG200 | 5.00 | 0.00 | 0.00 | 0.00 | 0.00 | 0.00 | 0.00 |
| PEG600 | 0.00 | 0.00 | 0.00 | 2.50 | 5.00 | 0.00 | 0.00 |
| KT024 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

TABLE 22

| wt % of: | C-1 | C-2 | C-3 | C-4 | C-5 | C-6 | C-7 |
|---|---|---|---|---|---|---|---|
| TiO2 | 16.00 | 24.00 | 24.00 | 24.00 | 24.00 | 24.00 | 24.00 |
| E7701 | 1.28 | 1.92 | 1.92 | 1.92 | 1.92 | 1.92 | 1.92 |
| PEA | 34.12 | 24.98 | 24.98 | 24.98 | 24.98 | 34.98 | 31.60 |
| VCL | 20.00 | 14.50 | 14.50 | 9.50 | 14.50 | 14.50 | 16.00 |
| IBOA | 0.00 | 7.50 | 7.50 | 5.00 | 5.00 | 10.00 | 0.00 |
| TBCH | 10.00 | 0.00 | 0.00 | 0.00 | 0.00 | 0.00 | 0.00 |
| CN131B | 0.00 | 10.00 | 10.00 | 10.00 | 10.00 | 0.00 | 0.00 |
| CTFA | 0.00 | 0.00 | 0.00 | 10.00 | 0.00 | 0.00 | 0.00 |
| SR495B | 0.00 | 0.00 | 0.00 | 0.00 | 5.00 | 0.00 | 8.23 |
| G1122 | 6.00 | 6.00 | 6.00 | 6.00 | 6.00 | 6.00 | 10.00 |
| DPGDA | 0.00 | 2.50 | 0.00 | 0.00 | 0.00 | 0.00 | 0.00 |
| PEG400 | 0.00 | 0.00 | 2.50 | 0.00 | 0.00 | 0.00 | 0.00 |
| CN963-B80 | 4.00 | 0.00 | 0.00 | 0.00 | 0.00 | 0.00 | 0.00 |
| KT024 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |
| STAB UV10 | 0.35 | 0.35 | 0.35 | 0.35 | 0.35 | 0.35 | 0.00 |

TABLE 23

| wt % of: | C-8 | C-9 | C-10 | C-11 | C-12 | C-13 | C-14 |
|---|---|---|---|---|---|---|---|
| TiO2 | 24.00 | 24.00 | 24.00 | 24.00 | 24.00 | 24.00 | 24.00 |
| E7701 | 1.92 | 1.92 | 1.92 | 1.92 | 1.92 | 1.92 | 1.92 |
| PEA | 34.83 | 32.33 | 29.83 | 32.33 | 29.83 | 32.33 | 29.83 |
| VCL | 16.00 | 16.00 | 16.00 | 16.00 | 16.00 | 16.00 | 16.00 |
| SR495B | 5.00 | 5.00 | 5.00 | 5.00 | 5.00 | 5.00 | 5.00 |
| G1122 | 10.00 | 10.00 | 10.00 | 10.00 | 10.00 | 10.00 | 10.00 |
| MPDA | 0.00 | 0.00 | 0.00 | 0.00 | 0.00 | 2.50 | 5.00 |
| PEG400 | 0.00 | 0.00 | 0.00 | 2.50 | 5.00 | 0.00 | 0.00 |
| PEG200 | 0.00 | 2.50 | 5.00 | 0.00 | 0.00 | 0.00 | 0.00 |
| KT024 | 4.00 | 4.00 | 4.00 | 4.00 | 4.00 | 4.00 | 4.00 |
| TPO | 2.95 | 2.95 | 2.95 | 2.95 | 2.95 | 2.95 | 2.95 |
| T410 | 0.30 | 0.30 | 0.30 | 0.30 | 0.30 | 0.30 | 0.30 |
| INHIB | 1.00 | 1.00 | 1.00 | 1.00 | 1.00 | 1.00 | 1.00 |

Results and Evaluation

The viscosity of the white inkjet inks was determined at 45° C. The Ink Composition Value ICV was calculated for each inkjet ink according to Formula (I). The "wt % Mono" and "wt % Poly" represent the weight percentages of the monofunctional polymerizable compounds respectively the polyfunctional polymerizable compounds, both based on the total weight of the polymerizable composition.

Each white inkjet ink was printed on a blue tarpaulin Type CLASSIC—B6000 from SIOEN INDUSTRIES with an Anapurna™ M2540 flatbed inkjet printer equipped with a UV LED curing system in wedges ranging from 10% to 100% at 720×1440 dpi. Printed tarpaulin patches having the same opacity for the white inkjet ink were selected for dry flexing. In Table 24, a result "OK" means that the printed tarpaulin patch was able to sustain 500,000 flexes, while "NOK" means that the printed tarpaulin patch failed after 10,000 flexes.

TABLE 24

| White ink | Viscosity (mPa · s) | ICV | wt % TiO2 | wt % Mono | wt % Poly | Dry Flexing |
|---|---|---|---|---|---|---|
| I-1 | 10.62 | 27 | 32 | 57.19 | 0.82 | OK |
| I-2 | 12.14 | 22 | 24 | 65.83 | 0.82 | OK |
| I-3 | 8.22 | 13 | 24 | 65.83 | 0.82 | OK |
| I-4 | 8.32 | 7 | 24 | 65.83 | 0.82 | OK |
| I-5 | 8.35 | −5 | 24 | 65.83 | 0.82 | OK |
| I-6 | 9.24 | 15 | 24 | 60.83 | 5.82 | OK |
| I-7 | 9.66 | 6 | 24 | 60.83 | 5.82 | OK |
| I-8 | 10.25 | 5 | 24 | 60.83 | 5.82 | OK |

TABLE 24-continued

| White ink | Viscosity (mPa·s) | ICV | wt % TiO2 | wt % Mono | wt % Poly | Dry Flexing |
|---|---|---|---|---|---|---|
| I-9 | 10.20 | 22 | 24 | 63.33 | 3.32 | OK |
| I-10 | 10.91 | 22 | 24 | 60.83 | 5.82 | OK |
| I-11 | 10.73 | 22 | 24 | 63.33 | 3.32 | OK |
| I-12 | 9.77 | 21 | 24 | 60.83 | 5.82 | OK |
| I-13 | n.a. | 22 | 24 | 63.33 | 3.32 | OK |
| I-14 | 11.06 | 21 | 24 | 60.83 | 5.82 | OK |
| I-15 | 11.52 | 20 | 24 | 63.33 | 3.32 | OK |
| I-16 | 11.54 | 18 | 24 | 60.83 | 5.82 | OK |
| I-17 | 12.02 | 21 | 24 | 64.33 | 3.32 | OK |
| I-18 | 12.84 | 21 | 24 | 60.83 | 5.82 | OK |
| I-19 | 13.82 | 22 | 24 | 65.83 | 0.82 | OK |
| I-20 | 13.18 | 30 | 24 | 65.83 | 0.82 | OK |
| C-1 | 10.00 | 48 | 16 | 70.12 | 4.82 | NOK |
| C-2 | 13.69 | 51 | 24 | 62.98 | 3.32 | NOK |
| C-3 | 12.92 | 47 | 24 | 62.98 | 3.32 | NOK |
| C-4 | 13.39 | 38 | 24 | 65.48 | 0.82 | NOK |
| C-5 | 16.20 | 40 | 24 | 65.48 | 0.82 | NOK |
| C-6 | 9.73 | 50 | 24 | 65.48 | 0.82 | NOK |
| C-7 | 18.46 | 31 | 24 | 65.83 | 0.82 | NOK |
| C-8 | 17.13 | 34 | 24 | 65.83 | 0.82 | NOK |
| C-9 | 15.83 | 34 | 24 | 63.33 | 3.32 | NOK |
| C-10 | 17.99 | 35 | 24 | 60.83 | 5.82 | NOK |
| C-11 | 18.29 | 33 | 24 | 63.33 | 3.32 | NOK |
| C-12 | 17.28 | 32 | 24 | 60.83 | 5.82 | NOK |
| C-13 | 15.72 | 36 | 24 | 63.33 | 3.32 | NOK |
| C-14 | 13.79 | 38 | 24 | 60.83 | 5.82 | NOK |

From Table 24, it should be clear that only tarpaulin patches printed with a white inkjet ink having an Ink Composition Value ICV of no more than 30 exhibited good dry flexing results.

Example 4

This example illustrates the inkjet printing of multicolour images on tarpaulin with a UV curable inkjet ink set that exhibits no cracking.
Results and Evaluation The white inkjet ink 1-2 of Example 3 was combined with the radiation curable CMYK inkjet ink set of Example 2 for forming a radiation curable CMY inkjet ink set that was used for printing a multicolour image on the same blue tarpaulin Type CLASSIC—B6000 from SIOEN INDUSTRIES of Example 3 with an Anapurna™ M2540 flatbed inkjet printer equipped with a UV LED curing system.

Printed samples were taken from different areas in the multicolour printed truck side curtain and tested for dry flexing. All tested samples exhibited no cracks visible by the naked eye or by microscope at 500,000 flexes.

The invention claimed is:

1. A radiation curable white inkjet ink comprising at least about 18.5 wt % of white pigment based on a total weight of the radiation curable white inkjet ink, 0 wt % to about 35 wt % of organic solvent based on the total weight of the radiation curable white inkjet ink, and a polymerizable composition comprising 1.0 wt % to about 15.0 wt % of one or more polyfunctional polymerizable compounds and at least about 85.0 wt % of one or more monofunctional polymerizable compounds based on a weight of the polymerizable composition;
wherein the polymerizable composition comprises less than about 25.0 wt % of methacrylated polymerizable compounds, more than about 50.0 wt % of acrylated polymerizable compounds, and less than about 10.0 wt % N-vinyl caprolactam (NVC); and
wherein the polymerizable composition has an Ink Composition Value (ICV) of 30 or less and the ICV is of Formula (1):

$$ICV = \frac{147 \times \text{wt \%}(NVC) + \sum_{i=1}^{18}(10 \times i - 75) \times \text{wt \%}(i)}{\sum_{i=1}^{18} \text{wt \%}(i)} \quad \text{Formula (1)}$$

wherein
i is an integer from 1 to 18;
wt % (NVC) is the wt % of N-vinyl caprolactam if present based on the weight of the polymerizable composition;
wt % (i) is the wt % of the monofunctional polymerizable compounds and the polyfunctional polymerizable compounds of a group i based on the weight of the polymerizable composition;
polymerizable compounds other than those in the group i are present at 0 wt % to about 20.0 wt % based on the weight of the polymerizable composition;
one or more oligomers are present at 0 wt % to about 15.0 wt % based on the weight of the polymerizable composition;
the monofunctional polymerizable compounds and the polyfunctional polymerizable compounds of group i=1 are selected from the group consisting of diethyleneglycolbutyletheracrylate, 2-ethyl hexyl acrylate, ethoxydiethyleneglycolacrylate, di(ethylene glycol) 2-ethylhexyl ether acrylate, methoxy polyethylene glycol (550) monomethacrylate, lauryl methacrylate, octyldecylacrylate, n-octylacrylate, 4-hydroxybutylacrylateglycidylether, 2-hydroxyethylmethacrylate acidphosphate, methoxypolyethyleneglycol (350) monomethacrylate, and mixtures thereof;
the monofunctional polymerizable compounds and the polyfunctional polymerizable compounds of group i=2 are selected from the group consisting of isodecyl acrylate, isononyl acrylate, caprolacton-modified-tetrahydrofurfurylacrylate, methoxypolyethyleneglycol (350) monoacrylate, tridecyl acrylate, 2 (2-ethoxyethoxy) ethyl acrylate, isooctyl acrylate, butylacrylate, polycaprolactone acrylate, and mixtures thereof;
the monofunctional polymerizable compounds and the polyfunctional polymerizable compounds of group i=3 are selected from the group consisting of methoxy polyethylene glycol (550) monoacrylate, 2-methoxyethyl acrylate, ethoxylated (4) lauryl acrylate, isoamylacrylate, methoxy-triethyleneglycolacrylate, ethoxylated (2) hydroxyethyl methacrylate, ethoxylated (30) bisphenol A diacrylate, polyethylene glycol (600) diacrylate, ethoxylated (8) nonylphenolacrylate, isodecylmethacrylate, and mixtures thereof;
the monofunctional polymerizable compounds and the polyfunctional polymerizable compounds of group i=4 are selected from the group consisting of ethoxylated (20) trimethylolpropane triacrylate, 4-hydroxy butyl acrylate, tridecyl methacrylate, polyethylene glycol (600) dimethacrylate, 1H,1H,5Hoctafluoropentylacrylate, ethoxylated (15) trimethylolpropane triacrylate, 2-ethoxyethylmethacrylate, and mixtures thereof;
the monofunctional polymerizable compounds and the polyfunctional polymerizable compounds of group i=5 are selected from the group consisting of lauryl acrylate, caprolacton-modified (6M) neopentylglycolhydroxypivalatediacrylate, ethoxylated (4) nonylphenol acrylate, polyethylene glycol (400) diacrylate, phe-noxypolyethyleneglycolacrylate, ethylacrylate, polyethylene glycol (400) dimethacrylate, and mixtures thereof;

the monofunctional polymerizable compounds and the polyfunctional polymerizable compounds of group i=6 are selected from the group consisting of ethoxylated (9) trimethylolpropane triacrylate, isostearylacrylate, tetrahydrofurfuryl acrylate, propoxylated (3) trimethylolpropane triacrylate, hydroxyethyl acrylate, propoxylated (5.5) glyceryl triacrylate, and mixtures thereof;

the monofunctional polymerizable compounds and the polyfunctional polymerizable compounds of group i=7 are selected from the group consisting of 2-ethylhexyl methacrylate, tetraethylene glycol dimethacrylate, ethoxylated (6) trimethylolpropane triacrylate, triethylene glycol dimethacrylate, (2-ethyl-2-methyl-1,3-dioxolan-4-yl)methyl acrylate, 2-hydroxypropyl acrylate, 2-propylheptylacrylate, hexanediol ethoxylated (3) diacrylate, 2,2,2-trifluoroethylacrylate, 2-(((butylamino)carbonyl)oxy)ethylester 2-propenoic acid, ethoxylated (10) bisphenol A dimethacrylate, and mixtures thereof;

the monofunctional polymerizable compounds and the polyfunctional polymerizable compounds of group i=8 are selected from the group consisting of ethoxylated (10) bisphenol A diacrylate, 3-ethyl-3-oxetanylmethacrylate, 2-phenoxyethyl acrylate, ethoxylated (2) bisphenol A dimethacrylate, benzylacrylate, 2-ethylhexyldiglycolacrylate, stearylacrylate, 2-hydroxybutylacrylate, methylacrylate, cyclic trimethylolpropane formal acrylate, ethoxylated (4) phenolacrylate, dicyclopentenylacrylate, dicyclopentenyl-oxyethylacrylate, and mixtures thereof;

the monofunctional polymerizable compounds and the polyfunctional polymerizable compounds of group i=9 are selected from the group consisting of polyethylene glycol (200) diacrylate, caprolacton-modified (2M) neopentylglycol hydroxypivalatediacrylate, cyclohexylacrylate, 2-hydroxy-3-phenoxypropylacrylate, propoxylated (3) glyceryl triacrylate, dimethylaminoethylmethacrylate, 1,4-cyclohexanedimethanolmonoacrylate, ethoxylated (3) trimethylolpropane triacrylate, diethylaminoethylmethacrylate, n-butyl methacrylate, and mixtures thereof;

the monofunctional polymerizable compounds and the polyfunctional polymerizable compounds of group i=10 are selected from the group consisting of propoxylated (6) trimethylolpropane triacrylate, cyclohexanespriro-2-(1,3-dioxolane-4-yl))methylacrylate, tetraethylene glycol diacrylate, 2-hydroxypropylmethacrylate, trimethylolpropane trimethacrylate, isophorylacrylate, 1,6 hexanediol dimethacrylate, and mixtures thereof;

the monofunctional polymerizable compounds and the polyfunctional polymerizable compounds of group i=11 are selected from the group consisting of propoxylated neopentyl glycol diacrylate, (Octahydro-4,7-methano-1H-indenyl)methyl acrylate, 1H,1H,5H-octafluoropentylmethacrylate, stearyl methacrylate, tetrahydrofurfuryl methacrylate, and mixtures thereof;

the monofunctional polymerizable compounds and the polyfunctional polymerizable compounds of group i=12 are selected from the group consisting of glycidyl methacrylate, 3,3,5-trimethylcyclohexanolmethacrylate, 1,6 hexanediol diacrylate, 1,4-butanediol diacrylate, dicyclopentenyl-oxyethylmethacrylate, 4-tert.butylcyclohexylacrylate, ethoxylated (2) neopentylglycoldiacrylate, isobutylmethacrylate, 3-methyl-1,5-pentanedioldiacrylate, and mixtures thereof;

the monofunctional polymerizable compounds and the polyfunctional polymerizable compounds of group i=13 are selected from the group consisting of allylmethacrylate, 2-phenoxyethyl methacrylate, ethoxylated (6) bisphenol A dimethacrylate, benzylmethacrylate, 1,4-butanediol dimethacrylate, tertiarybutylacrylate, 2-hydroxyethyl methacrylate, 2-(2-vinyloxyethoxy) ethyl acrylate, ethoxylated (4) bisphenol A diacrylate, and mixtures thereof;

the monofunctional polymerizable compounds and the polyfunctional polymerizable compounds of group i=14 are selected from the group consisting of tris (2-hydroxy ethyl) isocyanurate triacrylate, tripropylene glycol diacrylate, trimethylolpropane triacrylate, ethylmethacrylate, diethylene glycol dimethacrylate, dicyclopentadienyl acrylate, ethoxylated (3) bisphenol A diacrylate, ethoxylated (4) pentaerythritol tetraacrylate, and mixtures thereof;

the monofunctional polymerizable compounds and the polyfunctional polymerizable compounds of group i=15 are selected from the group consisting of di-acetonacrylamide, dioxaneglycoldiacrylate, ethoxylated (4) nonyl phenol methacrylate, and mixtures thereof;

the monofunctional polymerizable compounds and the polyfunctional polymerizable compounds of group i=16 are selected from the group consisting of 2,2,2-trifluoroethylmetacrylate, cyclohexylmethacrylate, dipentaerythritol pentaacrylate, and mixtures thereof;

the monofunctional polymerizable compounds and the polyfunctional polymerizable compounds of group i=17 are selected from the group consisting of 1,10-decanedioldiacrylate, isobornyl acrylate, di-trimethylolpropane tetraacrylate, diethylene glycol diacrylate, and mixtures thereof; and the monofunctional polymerizable compounds and the polyfunctional polymerizable compounds of group i=18 are selected from the group consisting of 1,3-butylene glycol diacrylate, pentaerythritol tetraacrylate, pentaerythritol triacrylate, dipropylene glycol diacrylate, methylmethacrylate, neopentyl glycol diacrylate, tertiarybutylmethacrylate, ethoxylated (4) bisphenol-A-dimethacrylate, isobornyl methacrylate, acryloyl morpholine, dicyclopentanyl acrylate, dihydrocyclopentadienylacrylate, and mixtures thereof.

2. The radiation curable white inkjet ink of claim 1, wherein the polymerizable composition comprises about 2.0 wt % to about 10.0 wt % of the one or more polyfunctional polymerizable compounds.

3. The radiation curable white inkjet ink of claim 1, wherein the radiation curable white inkjet ink comprises about 0 wt % of the organic solvent.

4. The radiation curable white inkjet ink of claim 1, wherein the radiation curable white inkjet ink comprises a photoinitiator comprising one or more acylphosphine oxides.

5. The radiation curable white inkjet ink of claim 1, wherein the white pigment comprises titanium dioxide.

6. The radiation curable white inkjet ink of claim 1, wherein the radiation curable white inkjet ink comprises about 18.5 wt % to about 25.0 wt % of the white pigment.

7. The radiation curable white inkjet ink of claim 1, wherein the radiation curable white inkjet ink comprises about 50.0 wt % to about 70.0 wt % of the polymerizable composition.

8. The radiation curable white inkjet ink of claim 1, wherein a viscosity of the radiation curable white inkjet ink is from about 5 mPa·s to about 16 mPa·s at 45° C. and a shear rate of about 1,000 s$^{-1}$.

9. An inkjet ink set comprising the radiation curable white inkjet ink of claim 1 and a plurality of radiation curable inkjet inks comprising colour pigments.

10. The inkjet ink set of claim 9, wherein the plurality of radiation curable inkjet inks comprise a polymerizable composition comprising 0 wt % to about 15.0 wt % of one or more polyfunctional polymerizable compounds and at least about 85.0 wt % of one or more monofunctional polymerizable compounds based on a weight of the polymerizable composition;

wherein the polymerizable composition has an Ink Composition Value (ICV) of 30 or less and the ICV is of Formula (I):

$$ICV = \frac{147 \times \text{wt \%}(NVC) + \sum_{i=1}^{18}(10 \times i - 75) \times \text{wt \%}(i)}{\sum_{i=1}^{18} \text{wt \%}(i)} \quad \text{Formula (I)}$$

wherein i is an integer from 1 to 18;

wt % (NVC) is the wt % of N-vinyl caprolactam if present based on the weight of the polymerizable composition;

wt % (i) is the wt % of the monofunctional polymerizable compounds and the polyfunctional polymerizable compounds of a group i based on the weight of the polymerizable composition;

polymerizable compounds other than those in the group i are present at 0 wt % to about 20.0 wt % based on the weight of the polymerizable composition;

one or more oligomers are present at 0 wt % to about 15.0 wt % based on the weight of the polymerizable composition;

the monofunctional polymerizable compounds and the polyfunctional polymerizable compounds of group i=1 are selected from the group consisting of diethylenegly-colbutyletheracrylate, 2-ethyl hexyl acrylate, ethoxydi-ethyleneglycolacrylate, di(ethylene glycol) 2-ethyl-hexyl ether acrylate, methoxy polyethylene glycol (550) monomethacrylate, lauryl methacrylate, octyl-decylacrylate, n-octylacrylate, 4-hydroxybutylacrylat-eglycidylether, 2-hydroxyethylmethacrylate acidphos-phate, methoxypolyethyleneglycol (350) monomethacrylate, and mixtures thereof;

the monofunctional polymerizable compounds and the polyfunctional polymerizable compounds of group i=2 are selected from the group consisting of isodecyl acrylate, isononyl acrylate, caprolacton-modified-tetra-hydrofurfurylacrylate, methoxypolyethyleneglycol (350) monoacrylate, tridecyl acrylate, 2 (2-ethoxy-ethoxy) ethyl acrylate, isooctyl acrylate, butylacrylate, polycaprolactone acrylate, and mixtures thereof;

the monofunctional polymerizable compounds and the polyfunctional polymerizable compounds of group i-3 are selected from the group consisting of methoxy polyethylene glycol (550) monoacrylate, 2-methoxy-ethyl acrylate, ethoxylated (4) lauryl acrylate, iso-amylacrylate, methoxy-triethyleneglycolacrylate, ethoxylated (2) hydroxyethyl methacrylate, ethoxy-lated (30) bisphenol A diacrylate, polyethylene glycol (600) diacrylate, ethoxylated (8) nonylphenolacrylate, isodecylmethacrylate, and mixtures thereof;

the monofunctional polymerizable compounds and the polyfunctional polymerizable compounds of group i=4 are selected from the group consisting of ethoxylated (20) trimethylolpropane triacrylate, 4-hydroxy butyl acrylate, tridecyl methacrylate, polyethylene glycol (600) dimethacrylate, 1H,1H,5Hoctafluoropentylacry-late, ethoxylated (15) trimethylolpropane triacrylate, 2-ethoxyethylmethacrylate, and mixtures thereof;

the monofunctional polymerizable compounds and the polyfunctional polymerizable compounds of group i=5 are selected from the group consisting of lauryl acry-late, caprolacton-modified (6M) neopentylglycolhy-droxypivalatediacrylate, ethoxylated (4) nonylphenol acrylate, polyethylene glycol (400) diacrylate, phe-noxypolyethyleneglycolacrylate, ethylacrylate, poly-ethylene glycol (400) dimethacrylate, and mixtures thereof;

the monofunctional polymerizable compounds and the polyfunctional polymerizable compounds of group i=6 are selected from the group consisting of ethoxylated (9) trimethylolpropane triacrylate, isostearylacrylate, tetrahydrofurfuryl acrylate, propoxylated (3) trimeth-ylolpropane triacrylate, hydroxyethyl acrylate, propoxylated (5.5) glyceryl triacrylate, and mixtures thereof;

the monofunctional polymerizable compounds and the polyfunctional polymerizable compounds of group i=7 are selected from the group consisting of 2-ethylhexyl methacrylate, tetraethylene glycol dimethacrylate, ethoxylated (6) trimethylolpropane triacrylate, triethyl-ene glycol dimethacrylate, (2-ethyl-2-methyl-1,3-di-oxolan-4-yl)methyl acrylate, 2-hydroxypropyl acrylate, 2-propylheptylacrylate, hexanediol ethoxylated (3) dia-crylate, 2,2,2-trifluoroethylacrylate, 2-(((butylamino) carbonyl)oxy)ethylester 2-propenoic acid, ethoxylated (10) bisphenol A dimethacrylate, and mixtures thereof;

the monofunctional polymerizable compounds and the polyfunctional polymerizable compounds of group i=8 are selected from the group consisting of ethoxylated (10) bisphenol A diacrylate, 3-ethyl-3-oxetanylmeth-acrylate, 2-phenoxyethyl acrylate, ethoxylated (2) bis-phenol A dimethacrylate, benzylacrylate, 2-ethylhexyl-diglycolacrylate, stearylacrylate, 2-hydroxybuty-lacrylate, methylacrylate, cyclic trimethylolpropane formal acrylate, ethoxylated (4) phenolacrylate, dicy-clopentenylacrylate, dicyclopentenyl-oxyethylacrylate, and mixtures thereof;

the monofunctional polymerizable compounds and the polyfunctional polymerizable compounds of group i=9 are selected from the group consisting of polyethylene glycol (200) diacrylate, caprolacton-modified (2M) neopentylglycol hydroxypivalatediacrylate, cyclohexy-lacrylate, 2-hydroxy-3-phenoxypropylacrylate, pro-poxylated (3) glyceryl triacrylate, dimethylaminoeth-ylmethacrylate, 1,4-cyclohexanedimethanolmonoacry-late, ethoxylated (3) trimethylolpropane triacrylate, diethylaminoethylmethacrylate, n-butyl methacrylate, and mixtures thereof;

the monofunctional polymerizable compounds and the polyfunctional polymerizable compounds of group i=10 are selected from the group consisting of propoxy-lated (6) trimethylolpropane triacrylate, cyclohexane-spriro-2-(1,3-dioxolane-4-yl))methylacrylate, tetraethylene glycol diacrylate, 2-hydroxypropylmethacrylate, trimethylolpropane trimethacrylate, isophorylacrylate, 1,6 hexanediol dimethacrylate, and mixtures thereof;

the monofunctional polymerizable compounds and the polyfunctional polymerizable compounds of group i=11 are selected from the group consisting of propoxylated neopentyl glycol diacrylate, (Octahydro-4,7-methano-1H-indenyl)methyl acrylate, 1H,1H,5H-octafluoropentylmethacrylate, stearyl methacrylate, tetrahydrofurfuryl methacrylate, and mixtures thereof;

the monofunctional polymerizable compounds and the polyfunctional polymerizable compounds of group i=12 are selected from the group consisting of glycidyl methacrylate, 3,3,5-trimethylcyclohexanolmethacrylate, 1,6 hexanediol diacrylate, 1,4-butanediol diacrylate, dicyclopentenyl-oxyethylmethacrylate, 4-tert.butylcyclohexylacrylate, ethoxylated (2) neopentylglycoldiacrylate, isobutylmethacrylate, 3-methyl-1, 5-pentanedioldiacrylate, and mixtures thereof;

the monofunctional polymerizable compounds and the polyfunctional polymerizable compounds of group i=13 are selected from the group consisting of allylmethacrylate, 2-phenoxyethyl methacrylate, ethoxylated (6) bisphenol A dimethacrylate, benzylmethacrylate, 1,4-butanediol dimethacrylate, tertiarybutylacrylate, 2-hydroxyethyl methacrylate, 2-(2-vinyloxyethoxy) ethyl acrylate, ethoxylated (4) bisphenol A diacrylate, and mixtures thereof;

the monofunctional polymerizable compounds and the polyfunctional polymerizable compounds of group i=14 are selected from the group consisting of tris (2-hydroxy ethyl) isocyanurate triacrylate, tripropylene glycol diacrylate, trimethylolpropane triacrylate, ethylmethacrylate, diethylene glycol dimethacrylate, dicyclopentadienyl acrylate, ethoxylated (3) bisphenol A diacrylate, ethoxylated (4) pentaerythritol tetraacrylate, and mixtures thereof;

the monofunctional polymerizable compounds and the polyfunctional polymerizable compounds of group i=15 are selected from the group consisting of diacetonacrylamide, dioxaneglycoldiacrylate, ethoxylated (4) nonyl phenol methacrylate, and mixtures thereof;

the monofunctional polymerizable compounds and the polyfunctional polymerizable compounds of group i=16 are selected from the group consisting of 2,2,2-trifluoroethylmetacrylate, cyclohexylmethacrylate, dipentaerythritol pentaacrylate, and mixtures thereof;

the monofunctional polymerizable compounds and the polyfunctional polymerizable compounds of group i=17 are selected from the group consisting of 1,10-decanedioldiacrylate, isobornyl acrylate, di-trimethylolpropane tetraacrylate, diethylene glycol diacrylate, and mixtures thereof; and the monofunctional polymerizable compounds and the polyfunctional polymerizable compounds of group i=18 are selected from the group consisting of 1,3-butylene glycol diacrylate, pentaerythritol tetraacrylate, pentaerythritol triacrylate, dipropylene glycol diacrylate, methylmethacrylate, neopentyl glycol diacrylate, tertiarybutylmethacrylate, ethoxylated (4) bisphenol-A-dimethacrylate, isobornyl methacrylate, acryloyl morpholine, dicyclopentanyl acrylate, dihydrocyclopentadienylacrylate, and mixtures thereof.

11. The inkjet ink set of claim 9, wherein a first radiation curable inkjet ink of the plurality of radiation curable inkjet inks comprises a beta-copper phthalocyanine pigment, a second radiation curable inkjet ink of the plurality of radiation curable inkjet inks comprises a quinacridone pigment, a diketopyrrolo pyrrole pigment, or a mixed crystal of either, a third radiation curable inkjet ink of the plurality of radiation curable inkjet inks comprises a carbon black pigment, and a fourth radiation curable inkjet ink of the plurality of radiation curable inkjet inks comprises a yellow pigment selected from the group consisting of C.I. Pigment Yellow 120, C.I. Pigment Yellow 139, C.I. Pigment Yellow 150, C.I. Pigment Yellow 155, C.I. Pigment Yellow 180, C.I. Pigment Yellow 185, C.I. Pigment Yellow 213, or a mixed crystal thereof.

12. A method of manufacturing the radiation curable white inkjet ink of claim 1 comprising the steps of:

milling a colour pigment in the presence of a polymeric dispersant and a polymerizable compound into a concentrated pigment dispersion; and diluting the concentrated pigment dispersion with polymerizable compounds to obtain the polymerizable composition of claim 1.

13. An inkjet printing method comprising the steps of:

jetting the radiation curable white inkjet ink of claim 1 on a substrate; and curing the radiation curable white inkjet ink.

14. The inkjet printing method of claim 13, wherein the substrate is leather or tarpaulin.

* * * * *